US006675288B2

(12) United States Patent
Farrell et al.

(10) Patent No.: US 6,675,288 B2
(45) Date of Patent: *Jan. 6, 2004

(54) APPARATUS FOR MAPPING INSTRUCTIONS USING A SET OF VALID AND INVALID LOGICAL TO PHYSICAL REGISTER ASSIGNMENTS INDICATED BY BITS OF A VALID VECTOR TOGETHER WITH A LOGICAL REGISTER LIST

(75) Inventors: James Arthur Farrell, Harvard, MA (US); Sharon Marie Britton, Westboro, MA (US); Harry Ray Fair, III, Newburyport, MA (US); Bruce Gieseke, San Jose, CA (US); Daniel Lawrence Leibholz, Cambridge, MA (US); Derrick R. Meyer, Austin, TX (US)

(73) Assignee: Hewlett-Packard Development Company L.P., Houston, TX (US)

( * ) Notice: Subject to any disclaimer, the term of this patent is extended or adjusted under 35 U.S.C. 154(b) by 160 days.

This patent is subject to a terminal disclaimer.

(21) Appl. No.: 10/144,097

(22) Filed: May 9, 2002

(65) Prior Publication Data

US 2002/0156997 A1 Oct. 24, 2002

Related U.S. Application Data

(63) Continuation of application No. 09/138,957, filed on Aug. 24, 1998, now Pat. No. 6,405,304.

(51) Int. Cl.[7] .............................................. G06F 15/00
(52) U.S. Cl. ........................ 712/216; 712/23; 712/217; 712/218; 712/219; 712/233; 712/237; 712/240; 712/244
(58) Field of Search ..................... 712/23, 216–219, 712/233, 237, 240, 244

(56) References Cited

U.S. PATENT DOCUMENTS

| 5,197,132 A | * | 3/1993 | Steely et al. ................. 712/217 |
| 5,524,262 A | * | 6/1996 | Colwell et al. ................ 712/23 |
| 5,546,554 A | * | 8/1996 | Yung et al. .................. 711/203 |
| 5,564,118 A | | 10/1996 | Steely, Jr. et al. .......... 395/375 |
| 5,881,305 A | * | 3/1999 | Walker ........................ 712/23 |
| 6,112,019 A | * | 8/2000 | Chamdani et al. .......... 712/214 |
| 6,119,223 A | * | 9/2000 | Witt ........................... 712/244 |
| 6,138,230 A | * | 10/2000 | Hervin et al. ............... 712/216 |
| 6,405,304 B1 | * | 6/2002 | Farrell et al. ................ 712/216 |

OTHER PUBLICATIONS

Yeh, Tse–Yu, and Patt, Yale N., "Two–Level Adaptive Training Branch Prediction," Association for Computing Machinery, 0–89791–460–0/91/0011/0051.

(List continued on next page.)

*Primary Examiner*—Nabil El-Hady
(74) *Attorney, Agent, or Firm*—Hamilton, Brook, Smith & Reynolds, P.C.

(57) ABSTRACT

A technique for managing register assignments. The technique involves maintaining, in a register list memory circuit having entries that respectively correspond to physical registers, a list of register assignments that assign logical registers to the physical registers. The technique further involves maintaining, in a vector memory circuit having bits that respectively correspond to the physical registers, a valid vector that forms, in combination with the list of register assignments, a list of valid register assignments. Furthermore, the technique involves storing, for an instruction that is mapped by the data processor, a copy of the valid vector from the vector memory circuit to a silo memory circuit. Preferably, the processor using the technique has the ability to execute branches of instructions speculatively, and to recover if it is determined that the processor executed down an incorrect instruction branch.

16 Claims, 20 Drawing Sheets

OTHER PUBLICATIONS

Keller, J., "The 21264: A Superscaler Alpha Processor with Out–of–Order Execution," Digital Semiconductor, Digital Equipment Corp., Hudson, MA, no date given.

Gieseke, B., et al., "A 600 MHz Superscalar RISC Microprocessor With Out–of–Order Execution," Digital Semiconductor, Digital Equipment Corporation, Hudson, MA, no date given.

Gwennap, L., "Digital 21264 Sets New Standard," *Microprocessor Report*, 10(14), Oct. 28, 1996.

Gieseke, B., et al., "FA 10.7: A 600 MHZ Superscalar RISC Microprocessor with Out–of–Order Execution." Paper presented at the *1997 IEEE International Solid–State Circuits Conference*, 0–7803–3721–2/97.

Emer, J., and Gloy, N., "A Language for Describing Predictors and Its Application to Automatic Synthesis," *Proceedings of the 24th Annual International Symposium on Computer Architecture*, Denver, CO, Jun. 2–4, 1997.

Johnson, M., "The Role of Exception Recovery," In *Superscalar Microprocessor Design* (New Jersey: PTR Prentice Hall), pp. 87–102 (1991).

* cited by examiner

| PHYSICAL REGISTER NUMBER | VALID SILO | | | | | | | | VALID BIT | VALID REG. LIST |
|---|---|---|---|---|---|---|---|---|---|---|
| | 0 | 1 | 2 | 3 | 4 | 5 | 6 | 7 | | |
| P0 | 1 | | | | | | | | 1 | R0 |
| P1 | 1 | | | | | | | | 1 | R1 |
| P2 | 1 | | | | | | | | 1 | R2 |
| P3 | 1 | | | | | | | | 1 | R3 |
| P4 | 1 | | | | | | | | 1 | R4 |
| P5 | 1 | | | | | | | | 1 | R5 |
| P6 | 0 | | | | | | | | 1 | R6 |
| P7 | 0 | | | | | | | | 0 | |
| P8 | 0 | | | | | | | | 0 | |
| P9 | 0 | | | | | | | | 0 | |
| P10 | 0 | | | | | | | | 0 | |
| P11 | 0 | | | | | | | | 0 | |
| P12 | 0 | | | | | | | | 0 | |
| P13 | 0 | | | | | | | | 0 | |
| P14 | 0 | | | | | | | | 0 | |
| P15 | 0 | | | | | | | | 0 | |

FIG. 5

| PHYSICAL REGISTER NUMBER | VALID SILO | | | | | | | | VALID BIT | REG. LIST |
|---|---|---|---|---|---|---|---|---|---|---|
|  | 0 | 1 | 2 | 3 | 4 | 5 | 6 | 7 |  |  |
| P0 | 1 | 1 |   |   |   |   |   |   | 1 | R0 |
| P1 | 1 | 0 |   |   |   |   |   |   | 0 | R1 |
| P2 | 1 | 1 |   |   |   |   |   |   | 1 | R2 |
| P3 | 1 | 1 |   |   |   |   |   |   | 1 | R3 |
| P4 | 1 | 1 |   |   |   |   |   |   | 1 | R4 |
| P5 | 1 | 1 |   |   |   |   |   |   | 1 | R5 |
| P6 | 0 | 0 |   |   |   |   |   |   | 1 | R6 |
| P7 | 0 | 0 |   |   |   |   |   |   | 1 | R1 |
| P8 | 0 | 0 |   |   |   |   |   |   | 0 |  |
| P9 | 0 | 0 |   |   |   |   |   |   | 0 |  |
| P10 | 0 | 0 |   |   |   |   |   |   | 0 |  |
| P11 | 0 | 0 |   |   |   |   |   |   | 0 |  |
| P12 | 0 | 0 |   |   |   |   |   |   | 0 |  |
| P13 | 0 | 0 |   |   |   |   |   |   | 0 |  |
| P14 | 0 | 0 |   |   |   |   |   |   | 0 |  |
| P15 | 0 | 1 |   |   |   |   |   |   | 0 |  |

FIG. 6

|  | VALID SILO | | | | | | | | VALID REG. |
| PHYSICAL REGISTER NUMBER | 0 | 1 | 2 | 3 | 4 | 5 | 6 | 7 | BIT / LIST |
|---|---|---|---|---|---|---|---|---|---|
| P0  | 1 | 1 | 1 |   |   |   |   |   | 1 R0 |
| P1  | 1 | 0 | 0 |   |   |   |   |   | 0 R1 |
| P2  | 1 | 1 | 1 |   |   |   |   |   | 1 R2 |
| P3  | 1 | 1 | 0 |   |   |   |   |   | 0 R3 |
| P4  | 1 | 1 | 1 |   |   |   |   |   | 1 R4 |
| P5  | 1 | 1 | 1 |   |   |   |   |   | 1 R5 |
| P6  | 0 | 1 | 1 |   |   |   |   |   | 1 R6 |
| P7  | 0 | 0 | 0 |   |   |   |   |   | 1 R1 |
| P8  | 0 | 0 | 0 |   |   |   |   |   | 0 R3 |
| P9  | 0 | 0 | 0 |   |   |   |   |   | 0 |
| P10 | 0 | 0 | 0 |   |   |   |   |   | 0 |
| P11 | 0 | 0 | 0 |   |   |   |   |   | 0 |
| P12 | 0 | 0 | 0 |   |   |   |   |   | 0 |
| P13 | 0 | 0 | 0 |   |   |   |   |   | 0 |
| P14 | 0 |   | 0 |   |   |   |   |   | 0 |
| P15 | 0 |   | 1 |   |   |   |   |   | 0 |

FIG. 7

| PHYSICAL REGISTER NUMBER | VALID SILO | | | | | | | | VALID BIT | REG. LIST |
|---|---|---|---|---|---|---|---|---|---|---|
| | 0 | 1 | 2 | 3 | 4 | 5 | 6 | 7 | | |
| P0  | 1 | 1 | 1 | 1 |   |   |   |   | 1 | R0 |
| P1  | 1 | 0 | 0 | 0 |   |   |   |   | 0 | R1 |
| P2  | 1 | 1 | 1 | 1 |   |   |   |   | 1 | R2 |
| P3  | 1 | 1 | 0 | 0 |   |   |   |   | 0 | R3 |
| P4  | 1 | 1 | 1 | 1 |   |   |   |   | 1 | R4 |
| P5  | 0 | 1 | 1 | 1 |   |   |   |   | 1 | R5 |
| P6  | 0 | 0 | 1 | 1 |   |   |   |   | 1 | R6 |
| P7  | 0 | 0 | 1 | 0 |   |   |   |   | 0 | R1 |
| P8  | 0 | 0 | 0 | 1 |   |   |   |   | 1 | R3 |
| P9  | 0 | 0 | 0 | 0 |   |   |   |   | 0 | R1 |
| P10 | 0 | 0 | 0 | 0 |   |   |   |   | 0 | |
| P11 | 0 | 0 | 0 | 0 |   |   |   |   | 0 | |
| P12 | 0 | 0 | 0 | 0 |   |   |   |   | 0 | |
| P13 | 0 | 0 | 0 | 0 |   |   |   |   | 0 | |
| P14 | 0 | 0 | 0 | 1 |   |   |   |   | 0 | |
| P15 | 0 | 0 | 0 | 1 |   |   |   |   | 0 | |

| PHYSICAL REGISTER NUMBER | VALID SILO | | | | | | | | VALID REG. BIT | LIST |
|---|---|---|---|---|---|---|---|---|---|---|
| | 0 | 1 | 2 | 3 | 4 | 5 | 6 | 7 | | |
| P0  | 1 | 1 | 1 | 1 | 1 | | | | 1 | R0 |
| P1  | 1 | 0 | 0 | 0 | 0 | | | | 0 | R1 |
| P2  | 1 | 1 | 1 | 1 | 0 | | | | 0 | R2 |
| P3  | 1 | 1 | 0 | 0 | 0 | | | | 0 | R3 |
| P4  | 1 | 1 | 1 | 1 | 1 | | | | 1 | R4 |
| P5  | 1 | 1 | 1 | 1 | 1 | | | | 1 | R5 |
| P6  | 0 | 0 | 1 | 1 | 0 | | | | 0 | R6 |
| P7  | 0 | 0 | 1 | 0 | 1 | | | | 1 | R1 |
| P8  | 0 | 0 | 0 | 1 | 1 | | | | 1 | R3 |
| P9  | 0 | 0 | 0 | 1 | 1 | | | | 1 | R1 |
| P10 | 0 | 0 | 0 | 0 | 0 | | | | 0 | R2 |
| P11 | 0 | 0 | 0 | 0 | 0 | | | | 0 | |
| P12 | 0 | 0 | 0 | 0 | 0 | | | | 0 | |
| P13 | 0 | 0 | 0 | 0 | 0 | | | | 0 | |
| P14 | 0 | 0 | 0 | 0 | 0 | | | | 0 | |
| P15 | 0 | 0 | 0 | 0 | 0 | | | | 0 | |

| PHYSICAL REGISTER NUMBER | VALID SILO | | | | | | | | VALID BIT | VALID REG. LIST |
|---|---|---|---|---|---|---|---|---|---|---|
| | 0 | 1 | 2 | 3 | 4 | 5 | 6 | 7 | | |
| P0 | 1 | 1 | 1 | 1 | 1 | 1 | | | 1 | R0 |
| P1 | 1 | 0 | 0 | 0 | 0 | 0 | | | 0 | R1 |
| P2 | 1 | 1 | 1 | 1 | 0 | 0 | | | 0 | R2 |
| P3 | 1 | 1 | 0 | 0 | 0 | 0 | | | 0 | R3 |
| P4 | 1 | 1 | 1 | 1 | 1 | 1 | | | 1 | R4 |
| P5 | 1 | 1 | 1 | 1 | 1 | 1 | | | 1 | R5 |
| P6 | 0 | 1 | 1 | 1 | 1 | 1 | | | 1 | R6 |
| P7 | 0 | 0 | 0 | 0 | 0 | 0 | | | 0 | R1 |
| P8 | 0 | 0 | 0 | 1 | 1 | 1 | | | 1 | R3 |
| P9 | 0 | 0 | 0 | 0 | 1 | 1 | | | 1 | R1 |
| P10 | 0 | 0 | 0 | 0 | 0 | 0 | | | 0 | R2 |
| P11 | 0 | 0 | 0 | 0 | 0 | 0 | | | 0 | R1 |
| P12 | 0 | 0 | 0 | 0 | 0 | 0 | | | 0 | |
| P13 | 0 | 0 | 0 | 0 | 0 | 0 | | | 0 | |
| P14 | 0 | 0 | 0 | 0 | 0 | 1 | | | | |
| P15 | 0 | 0 | 0 | 0 | 0 | 1 | | | | |

FIG. 10

| PHYSICAL REGISTER NUMBER | VALID SILO | | | | | | | | VALID BIT | REG. LIST |
|---|---|---|---|---|---|---|---|---|---|---|
| | 0 | 1 | 2 | 3 | 4 | 5 | 6 | 7 | | |
| P0  | 1 | 1 | 1 | 1 | 1 | 1 | 1 |   | 1 | R0 |
| P1  | 1 | 0 | 0 | 0 | 0 | 0 | 0 |   | 0 | R1 |
| P2  | 1 | 1 | 1 | 1 | 0 | 0 | 0 |   | 0 | R2 |
| P3  | 1 | 1 | 0 | 0 | 0 | 0 | 0 |   | 0 | R3 |
| P4  | 1 | 1 | 1 | 1 | 1 | 1 | 1 |   | 1 | R4 |
| P5  | 0 | 1 | 1 | 1 | 1 | 1 | 0 |   | 0 | R5 |
| P6  | 0 | 0 | 1 | 1 | 0 | 0 | 0 |   | 1 | R6 |
| P7  | 0 | 0 | 0 | 1 | 1 | 1 | 1 |   | 0 | R1 |
| P8  | 0 | 0 | 0 | 1 | 1 | 1 | 1 |   | 1 | R3 |
| P9  | 0 | 0 | 0 | 0 | 1 | 1 | 1 |   | 0 | R1 |
| P10 | 0 | 0 | 0 | 0 | 0 | 1 | 1 |   | 1 | R2 |
| P11 | 0 | 0 | 0 | 0 | 0 | 0 | 1 |   | 1 | R1 |
| P12 | 0 | 0 | 0 | 0 | 0 | 0 | 0 |   | 1 | R5 |
| P13 | 0 | 0 | 0 | 0 | 0 | 0 | 0 |   | 0 | |
| P14 | 0 | 0 | 0 | 0 | 0 | 0 | 0 |   | 0 | |
| P15 | 0 | 0 | 0 | 0 | 0 | 0 | 1 |   | 0 | |

FIG. 11

| PHYSICAL REGISTER NUMBER | VALID SILO | | | | | | | | VALID BIT | REG. LIST |
|---|---|---|---|---|---|---|---|---|---|---|
| | 0 | 1 | 2 | 3 | 4 | 5 | 6 | 7 | | |
| P0  | 0 | 1 | 1 | 1 | 1 | 1 | 1 |   | 1 | R0 |
| P1  | 0 | 0 | 0 | 0 | 0 | 0 | 0 |   | 0 | R1 |
| P2  | 0 | 1 | 1 | 1 | 0 | 0 | 0 |   | 0 | R2 |
| P3  | 0 | 1 | 0 | 0 | 0 | 0 | 0 |   | 0 | R3 |
| P4  | 0 | 1 | 1 | 1 | 1 | 1 | 1 |   | 1 | R4 |
| P5  | 0 | 1 | 1 | 1 | 1 | 1 | 0 |   | 0 | R5 |
| P6  | 0 | 0 | 1 | 1 | 1 | 1 | 1 |   | 1 | R6 |
| P7  | 0 | 0 | 1 | 1 | 0 | 0 | 0 |   | 0 | R1 |
| P8  | 0 | 0 | 0 | 1 | 1 | 1 | 1 |   | 1 | R3 |
| P9  | 0 | 0 | 0 | 0 | 1 | 1 | 1 |   | 1 | R1 |
| P10 | 0 | 0 | 0 | 0 | 0 | 0 | 1 |   | 1 | R2 |
| P11 | 0 | 0 | 0 | 0 | 0 | 0 | 1 |   | 1 | R1 |
| P12 | 0 | 0 | 0 | 0 | 0 | 0 | 0 |   | 0 | R5 |
| P13 | 0 | 0 | 0 | 0 | 0 | 0 | 0 |   |   |    |
| P14 | 0 ← R | 0 | 0 | 0 | 0 | 0 | 0 ← I |   |   |    |
| P15 |   |   |   |   |   |   |   |   |   |    |

FIG. 12

| PHYSICAL REGISTER NUMBER | VALID SILO | | | | | | | | VALID BIT | REG. LIST |
|---|---|---|---|---|---|---|---|---|---|---|
| | 0 | 1 | 2 | 3 | 4 | 5 | 6 | 7 | | |
| P0  | | | 0 | 1 | 1 | 0 | 0 | | 1 | R0 |
| P1  | | | 0 | 0 | 0 | 0 | 0 | | 0 | R1 |
| P2  | | | 0 | 1 | 0 | 0 | 0 | | 0 | R2 |
| P3  | | | 0 | 0 | 0 | 0 | 0 | | 0 | R3 |
| P4  | | | 0 | 1 | 1 | 0 | 0 | | 1 | R4 |
| P5  | | | 0 | 1 | 1 | 0 | 0 | | 1 | R5 |
| P6  | | | 0 | 1 | 1 | 0 | 0 | | 1 | R6 |
| P7  | | | 0 | 0 | 0 | 0 | 0 | | 0 | R1 |
| P8  | | | 0 | 1 | 1 | 0 | 0 | | 1 | R3 |
| P9  | | | 0 | 1 | 1 | 0 | 0 | | 1 | R1 |
| P10 | | | 0 | 0 | 0 | 0 | 0 | | 1 | R2 |
| P11 | | | 0 | 0 | 0 | 0 | 0 | | 0 | R1 |
| P12 | | | 0 | 0 | 0 | 0 | 0 | | 0 | R5 |
| P13 | | | 0 | 0 | 0 | 0 | 0 | | 0 | |
| P14 | | | ← | | ← | | ← | | 0 | |
| P15 | | | R | | K | | I | | 0 | |

FIG. 13

```
PS0[0] = encode of SMAT0[0]<m:0> and S0V[0]
PS1[0] = encode of SMAT1[0]<m:0> and S1V[0]
 PD[0] = encode of FL[0]<m:0> and DV[0]

PS0[1] = encode of SMAT0[1]<m:0> and S0V[1] and not
              {(S0[1] = D[0]) and DV[0]} or
         encode of FL[0]<m:0> and DV[0] and (S0[1] = D[0])
PS1[1] = encode of SMAT1[1]<m:0> and S1V[1] and not
              {(S1[1] = D[0]) and DV[0]} or
         encode of FL[0]<m:0> and DV[0] and (S1[1] = D[0])
 PD[1] = encode of FL[1]<m:0> and DV[1]

PS0[2] = encode of SMAT0[2]<m:0> and S0V[2] and not
             {(S0[2] = D[0]) and DV[0]} and not
             {(S0[2] = D[1]) and DV[1]} or
         encode of FL[0]<m:0> and DV[0] and (S0[2] = D[0]) and not
             {(S0[2] = D[1]) and DV[1]} or
         encode of FL[1]<m:0> and DV[1] and (S0[2] = D[1])

PS1[2] = encode of SMAT1[2]<m:0> and S1V[2] and not
             {(S1[2] = D[0]) and DV[0]} and not
             {(S1[2] = D[1]) and DV[1]} or
         encode of FL[0]<m:0> and DV[0] and (S1[2] = D[0]) and not
           - {(S1[2] = D[1]) and DV[1]} or
         encode of FL[1]<m:0> and DV[1] and (S1[2] = D[1])
 PD[2] = encode of FL[2]<m:0> and DV[2]

PS0[3] = encode of SMAT0[3]<m:0> and S0V[3] and not
             {(S0[3] = D[0]) and DV[0]} and not
             {(S0[3] = D[1]) and DV[1]} and not
             {(S0[3] = D[2]) and DV[2]} or
         encode of FL[0]<m:0> and DV[0] and (S0[3] = D[0]) and not
             {(S0[3] = D[1]) and DV[1]} and not
             {(S0[3] = D[2]) and DV[2]} or
         encode of FL[1]<m:0> and DV[1] and (S0[3] = D[1]) and not
             {(S0[3] = D[2]) and DV[2]} or
         encode of FL[2]<m:0> and DV[2] and (S0[3] = D[2])
PS1[3] = encode of SMAT1[3]<m:0> and S1V[3] and not
             {(S1[3] = D[0]) and DV[0]} and not
             {(S1[3] = D[1]) and DV[1]} and not
             {(S1[3] = D[2]) and DV[2]} or
         encode of FL[0]<m:0> and DV[0] and (S1[3] = D[0]) and not
             {(S1[3] = D[1]) and DV[1]} and not
             {(S1[3] = D[2]) and DV[2]} or
         encode of FL[1]<m:0> and DV[1] and (S1[3] = D[1]) and
             {(S1[3] = D[2]) and DV[2]} or
         encode of FL[2]<m:0> and DV[2] and (S1[3] = D[2])
 PD[3] = encode of FL[3]<m:0> and DV[3]
```

FIG. 17B

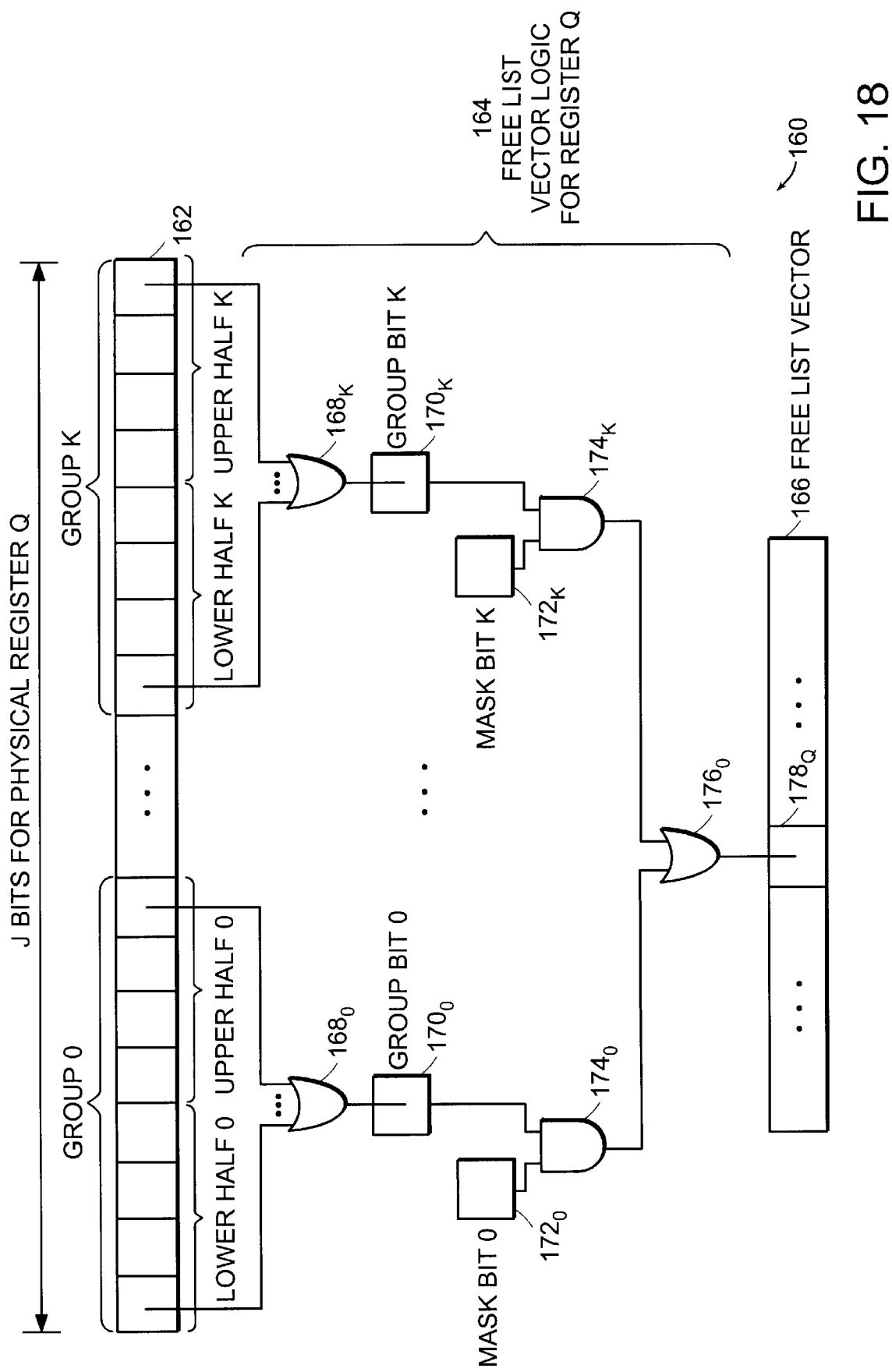

APPARATUS FOR MAPPING INSTRUCTIONS USING A SET OF VALID AND INVALID LOGICAL TO PHYSICAL REGISTER ASSIGNMENTS INDICATED BY BITS OF A VALID VECTOR TOGETHER WITH A LOGICAL REGISTER LIST

RELATED APPLICATION

This application is a Continuation of U.S. application Ser. No. 09/138,957 filed Aug. 24, 1998, now U.S. Pat. No. 6,405,304, issued Jun. 11, 2002, which is incorporated herein in its enitrety by reference.

BACKGROUND OF THE INVENTION

Instruction pipelining generally involves splitting a data processor into a series of stages called a pipeline. Typically, the pipeline stages process different portions of a stream of instructions concurrently. For example, a fetch stage may fetch instructions from main memory while an execution stage executes one or more previously fetched instructions.

In general, pipelined processors are susceptible to delays caused by instruction dependencies within the instruction stream. For example, consider the following instruction stream having instructions (1), (2) and (3), where (OP1), (OP2) and (OP3) are operations (e.g., add, shift, logical OR) that require various amounts of time (processor cycles) to complete.

$$R2=R1\ (OP1)\ R5 \quad (1)$$

$$R1=R3\ (OP2)\ R8 \quad (2)$$

$$R7=R4\ (OP3)\ R6 \quad (3)$$

An instruction dependency exists between instructions (1) and (2) because instruction (1) reads data from register RI, and instruction (2) subsequently writes new data to register R1. In order for instruction (1) to provided a correct result, instruction (2) must write the new data to register R1 after instruction (1) reads the original data from register R1. If instruction (2) writes to register RI before instruction (1) reads from register R1, instruction (1) will read the new data written by instruction (2) rather than the original data, and thus may provide an incorrect result. Accordingly, a write-after-read (WAR) dependency (or data hazard) exists between instructions (1) and (2).

Instruction (3) does not access any registers that are accessed by instructions (1) or (2). Accordingly, no instruction dependency exists between instruction (3) and instructions (1) and (2).

In addition to WAR dependencies, there are other types of instruction dependencies that can occur within an instruction stream. In particular, write-after-write (WAW) dependencies involve two instructions that write to the same register in an instruction stream. The two instructions must write to the register in proper order. Otherwise, the wrong data will be left in that register after the two instructions complete. If the wrong data is left in that register, another instruction that reads from that register may provide an incorrect result.

Another type of dependency is a read-after-write (RAW) dependency which involves a first instruction that writes to a register, and a subsequent instruction that reads from the same register. The first instruction must write to the register before the subsequent instruction reads from that register. Otherwise, the subsequent instruction will not read the result of the first instruction, and instead read old data.

Some pipelined processors resolve instruction dependencies by delaying instructions in the pipeline. For the above example, such a processor may issue instruction (1), and delay issuing instruction (2) until instruction (1) reads from register R1. The delay prevents instruction (2) from inadvertently overwriting the contents of register R1 before instruction (1) reads from register R1. Accordingly, the data hazard between instructions (1) and (2) is resolved.

Some processors which delay instructions to resolve instruction dependencies have the ability to issue instructions out-of-order. Such out-of-order processors may issue other instructions in place of the delayed instructions so that the processor remains busy. For the above example, an out-of-order processor may delay issuance of instruction (2) while instruction (1) executes. Furthermore, the processor may issue instruction (3) in place of instruction (2) such that stages of the processor do not become idle. Since no dependency exists for instruction (3), it does not matter when instruction (3) executes relative to instructions (1) and (2). Once instruction (1) has read from register R1, the processor may issue instruction (2) even though instruction (3) has already issued.

SUMMARY OF THE INVENTION

The conventional approach of resolving instruction dependencies by delaying particular instructions and issuing other instructions in their place is not very effective in certain situations. For example, when the instruction stream has many instruction dependencies and few instructions without dependencies, many instructions must be delayed, and few instructions can be issued in place of the delayed instructions. For such an instruction stream (or portions thereof), the conventional approach may not be able to keep the pipelined processor busy.

The present invention is a technique for mapping instructions to resolve certain types of instruction dependencies such as write-after-read (WAR) dependencies and write-after-write (WAW) dependencies. In some situations, the instructions, once mapped, no longer access the same registers. Accordingly, the particular dependencies are resolved without delaying instructions.

One embodiment of the technique involves obtaining an instruction having at least one logical operand that identifies a logical register. The technique further involves renaming the logical operand with a physical operand that identifies a physical register according to a set of assignments that assign logical registers to physical registers. The instruction is mapped when each logical operand has been renamed. Accordingly, there is no need to delay instructions, and pipeline throughput can be maintained.

Mapped instructions may include logical source and destination operands that identify particular logical registers. Renaming a logical source operand preferably involves finding, in the set of assignments, an existing assignment according to the logical source operand. The found existing assignment may assign the particular logical register to a particular physical register. Renaming may further involve replacing, in the obtained instruction, the logical source operand with a physical source operand that identifies the particular physical register according to the found existing assignment.

The set of assignments may include valid assignments and invalid assignments. Furthermore, finding the existing assignment may involve locating, in the set of assignments, a valid assignment and at least one invalid assignment according to the logical source operand. Finding may further involve selecting, as the existing assignment, the located valid assignment from the located valid and invalid assignments.

Renaming the logical destination operand may involve generating a new assignment according to the set of assignments. The generated new assignment may assign the particular logical register to a particular physical register. Renaming may further involve replacing the logical destination operand with a physical destination operand that identifies the particular physical register according to the generated new assignment.

A previously generated assignment may assign the particular logical register to a physical register that is different than the particular physical register. In this situation, generating the new assignment may involve invalidating the previously generated assignment. Generating may further involve creating and validating the generated new assignment that assigns the particular logical register to the particular physical register.

Another embodiment of the invention is directed to a technique for managing register assignments. The technique involves maintaining, in a register list memory circuit having entries that respectively correspond to physical registers, a list of register assignments that assign logical registers to the physical registers. Additionally, the technique involves maintaining, in a vector memory circuit having bits that respectively correspond to the physical registers, a valid vector that forms, in combination with the list of register assignments, a list of valid register assignments. Furthermore, the technique involves storing, for an instruction that is mapped by the data processor, a copy of the valid vector from the vector memory circuit to a silo memory circuit. Preferably, the processor using the technique has the ability to execute branches of instructions speculatively, and to recover if it is determined that the processor executed down an incorrect instruction branch.

As will now be explained, storage of the valid vector in memory enables the state of the processor to easily and quickly recover. The technique preferably involves transferring the stored copy of the valid vector from the silo memory circuit to the vector memory circuit in response to a signal indicating that an incorrect instruction branch has executed to restore the list of valid register assignments to the data processor. In this situation, the previous register assignments are restored when the valid vector is retrieved from memory and transferred back to the vector memory circuit.

The technique may further involve canceling the copy of the valid vector stored in the silo memory circuit in response to a signal indicating that the instruction is retired.

When the instruction includes a logical source operand that identifies a particular logical register, the technique may involve finding, in the register list memory circuit, a first entry that assigns the particular logical register to a first physical register, and a second entry that assigns the particular logical register to a second physical register that is different than the first physical register. The technique may further involve selecting one of the first and second entries as a valid entry according to the valid vector maintained in the vector memory circuit, the selected valid entry being used by the data processor to map the instruction.

Finding the first and second entries may involve comparing contents of each of the entries in the register list memory circuit with a signal that identifies the particular logical register to find the first and second entries.

When the instruction includes a logical destination operand that identifies a particular logical register, the silo memory circuit may store a plurality of valid vectors that correspond to a plurality of previously mapped instructions. In this situation, the technique involves performing a logical OR operation based on the plurality of valid vectors to identify, in the register list memory circuit, an unused entry that corresponds to a particular physical register. The technique further involves setting contents of the unused entry according to the logical destination operand to assign the particular logical register to the particular physical register. The result is that the physical register that is assigned to store the result of the mapped instruction is an unused physical register. Accordingly, WAR and WAW dependencies are resolved.

Preferably, the technique further involves clearing, in the valid vector stored in the vector memory circuit, a first bit that corresponds to the particular physical register to invalidate a previously valid register assignment. The technique may further involve setting, in the valid vector stored in the vector memory circuit, a second bit that is different than the first bit to form a new valid register assignment. This feature of the invention enables the processor to store past register assignments by maintaining entries in the register list memory circuit and transferring valid vectors from the vector memory circuit to the silo memory circuit. The memory space required to store the valid vectors is small such that register assignments for many processor cycles can be saved.

The vector memory circuit preferably includes additional valid vectors that correspond to additional instructions that are mapped by the data processor. In this situation, the technique further involves storing, for the additional instructions, copies of the additional valid vectors from the vector memory circuit to the silo memory circuit simultaneously. This feature of the invention enables the invention to be used in superscaler machines.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a chart of initial contents of portions of a renaming circuit shown in FIG. 2.

FIG. 6 is a chart of contents, updated during a first processor cycle, of portions of the renaming circuit shown in FIG. 2.

FIG. 7 is a chart of contents, updated during a second processor cycle, of portions of the renaming circuit shown in FIG. 2.

FIG. 8 is a chart of contents, updated during a third processor cycle, of portions of the renaming circuit shown in FIG. 2.

FIG. 9 is a chart of contents, updated during a fourth processor cycle, of portions of the renaming circuit shown in FIG. 2.

FIG. 10 is a chart of contents, updated during a fifth processor cycle, of portions of the renaming circuit shown in FIG. 2.

FIG. 11 is a chart of contents, updated during a sixth processor cycle, of portions of the renaming circuit shown in FIG. 2.

FIG. 12 is a chart of contents, updated in response to a retired instruction, of portions of the renaming circuit shown in FIG. 2.

FIG. 13 is a chart of contents, updated in response to a killed instruction, of portions of the renaming circuit shown in FIG. 2.

FIG. 17B is a set of logical calculations for lines entering a register encoder of the circuit in FIG. 17A.

FIG. 18 is a circuit diagram of an alternative portion of the free list circuit to that shown in FIG. 14.

DETAILED DESCRIPTION OF A PREFERRED EMBODIMENT

Figure 1:
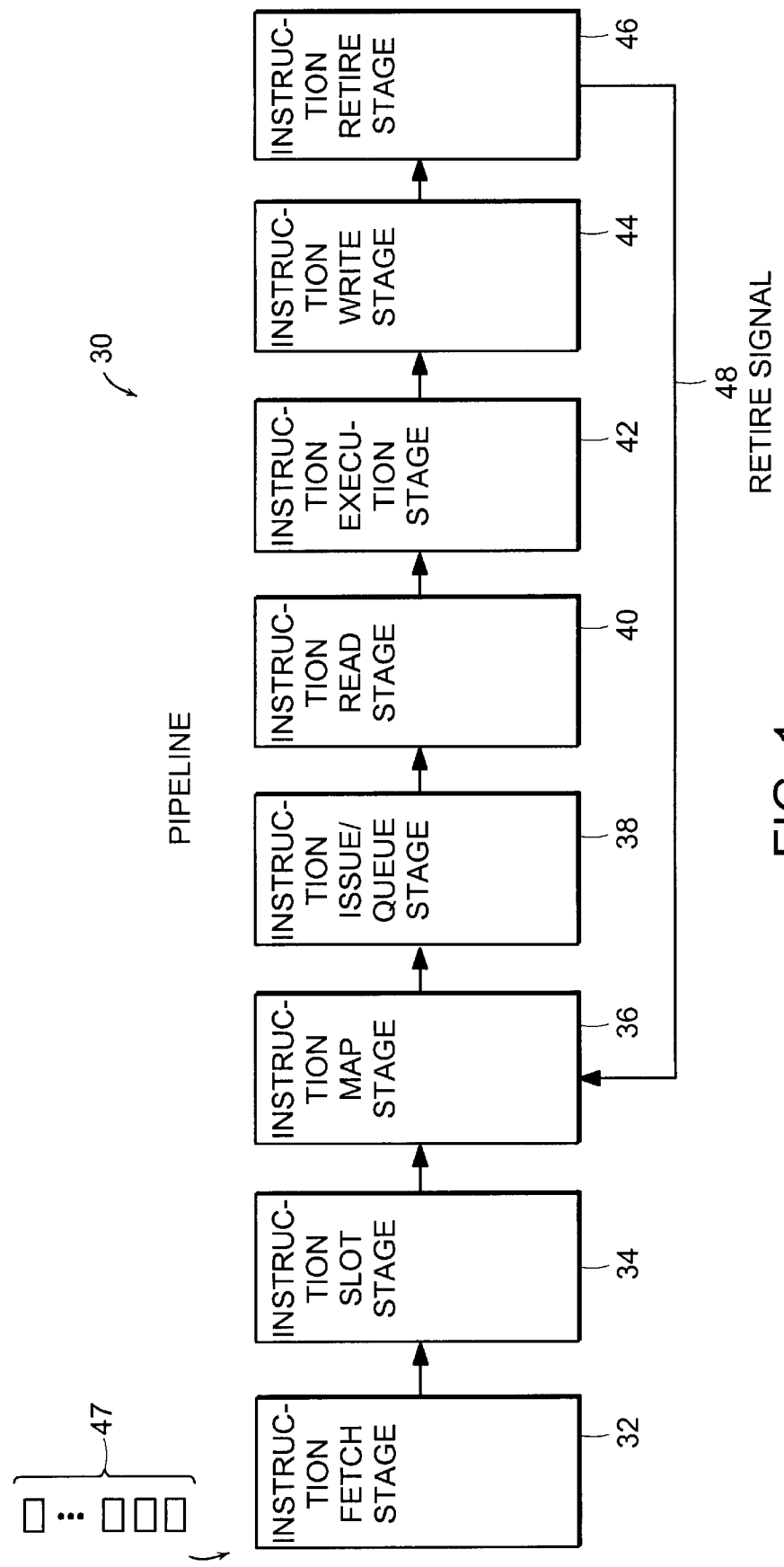
FIG. 1 is a block diagram of an instruction pipeline for a data processor in which the present invention may be used.

The present invention involves mapping instructions such that certain types of instruction dependencies are resolved. Preferably, the invention is used in an instruction pipeline for a data processor such as the pipeline 30 shown in FIG. 1. The pipeline 30 is a series of stages including an instruction fetch stage 32, an instruction slot stage 34, an instruction map stage 36, an instruction issue/queue stage 38, an instruction read stage 40, an instruction execution stage 42, an instruction write stage 44, and an instruction retire stage 46.

The stages of the pipeline 30 process a stream of instructions 47. First, the instruction fetch stage 32 retrieves the instructions 47 from an instruction memory (not shown). Second, the instruction slot stage 34 determines to which execution unit the fetched instructions should be sent, e.g., a floating point unit or an integer unit (not shown). Third, the instruction map stage 36 maps the instructions such that the instructions refer to physical registers rather than logical registers. Fourth, an instruction issue/queue stage 38 queues the instructions for execution. Fifth, an instruction read stage 40 reads data used by the instructions from the physical registers. Next, an instruction execution stage 42 executes the instructions. Then, an instruction write stage 44 stores results of the executed instructions into the physical registers. Finally, an instruction retire stage 46 retires the instructions by committing the processor state to the results of the operation. The instruction retire stage 46 provides a retire signal 48 indicating which instructions have retired. The instruction map stage 36 receives the retire signal 48.

Figure 2:
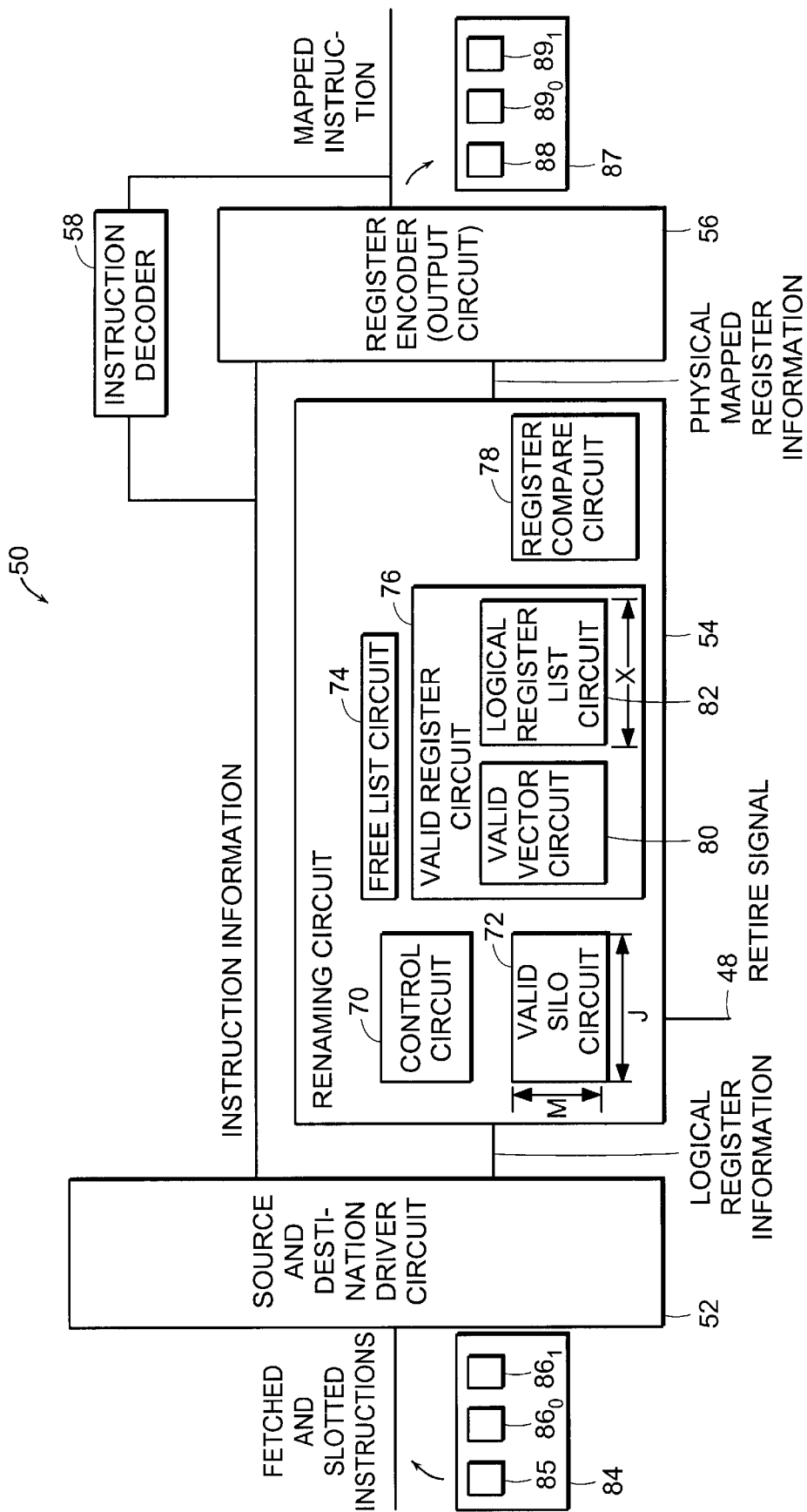
FIG. 2 is a block diagram of portions of an instruction map stage shown in FIG. 1.

For each instruction of the instruction stream 47, the instruction map stage 36 renames any logical operands that identify logical registers to physical operands that identify physical registers. As shown in FIG. 2, the instruction map stage 36 has a portion 50 including a source and destination driver circuit 52, a renaming circuit 54, an instruction decoder 58 and a register encoder 56 (e.g., an output circuit). The source and destination driver circuit 52 connects with the instruction decoder 58 and the register encoder 56. The source and destination driver circuit 52 further connects with the renaming circuit 54. The renaming circuit 54 further connects with register encoder 56. Additionally, the register encoder 56 and the instruction decoder 58 are connected.

The source and destination driver circuit 52 receives fetched and slotted instructions. For example, as shown in FIG. 2, the source and destination driver circuit 52 receives an instruction 84 having a logical destination operand 85, and two logical source operands 860,861. The source and destination driver circuit 52 provides instruction information (e.g., a signal identifying the instruction 85) to the instruction decoder 58 and to the register encoder 56. The source and destination driver circuit 52 further provides logical register information (e.g., signals identifying the logical registers referred to by the two logical source operands 860,861) to the renaming circuit 54. The renaming circuit 54 receives the logical register information from the source and destination driver circuit 52, and provides physical mapped register information (e.g., signals identifying the physical registers to which are assigned the identified logical registers) to the register encoder 56. The renaming circuit 54 further receives the retire signal 48 from the instruction retire stage 46. The instruction decoder 58 and the register encoder 56 operate to provide mapped instructions to the next stage of the pipeline 30. In particular, the instruction information from the source and destination circuit 52 and the physical mapped register information are used to form the mapped instructions. For example, as shown in FIG. 2, a mapped instruction 87 which includes a physical destination operand 88 and two physical source operands 890,891 is provided.

Further details of the renaming circuit 54 will now be described. The renaming circuit 54 renames logical registers identified by logical source operands to physical registers according to existing register assignments. Additionally, the renaming circuit 54 generates new assignments according to the existing assignments, and renames logical registers identified by logical destination operands to physical registers according to the generated new assignments.

The renaming circuit 54 includes a control circuit 70, a valid silo circuit 72, a free list circuit 74, a valid register circuit 76 and a register compare circuit 78. The valid register circuit 76 includes a valid vector circuit 80 and a logical register list circuit 82.

Each of the valid silo circuit 72, the free list circuit 74, the valid vector circuit 80 and the logical register list circuit 82 is a memory circuit. In particular, the valid silo circuit 72 includes M entries (or rows), where M equals the number of physical registers (e.g., general purpose registers) available for use in the pipelined processor 30. Each of the M entries corresponds to one of the M physical registers in the pipelined processor 30. Each of the M entries is J bits deep, J equaling the maximum number of instructions that can be issued but not retired (i.e., that can be inflight) at any one time in the pipeline 30. Preferably, M equals 80 and J equals 80 such that the valid silo circuit 72 includes an 80×80 (M rows by J columns) storage matrix.

The free list circuit 74 has a set of M single bit locations (e.g., 80 bits). Each of the M bits corresponds to one of the M physical registers in the pipelined processor 30 in a manner similar to that of the M entries of the valid silo circuit 72.

The valid vector circuit 80 also has a set of M single bit locations (e.g., 80 bits). Each of the M bits of the valid vector circuit 80 corresponds to one of the M physical registers in the pipelined processor 30 as well.

The logical register list circuit 82 includes M entries that respectively correspond to the M physical registers in the pipelined processor 30. Each entry is X bits wide, X being the number of bits needed to uniquely encode each logical register supported by the pipelined processor 30. Preferably, the pipelined processor 30 supports 32 logical registers, and so X equals 5 ($2^5$ equals 32).

The valid register circuit 76 provides valid register assignments for an instruction currently being mapped by the instruction map stage 36. In particular, the logical register list circuit 82 stores register assignments that assign logical registers to physical registers. The register assignments may be valid or invalid for the instruction currently being mapped. The valid vector circuit 80 indicates which of the assignments in the logical register list circuit 82 are valid, and which are invalid. In particular, the M bits of the valid vector circuit 80 store a valid vector. For entries in the logical register list circuit 82 that are valid, the bits of the valid vector corresponding to those entries are set. For entries in the logical register list circuit 82 that are invalid, the bits of the valid vector corresponding to those entries are cleared.

When the renaming circuit 54 generates a new assignment for a logical register, the control circuit 70 finds an entry in the logical register list circuit 82 previously assigning that logical register to a physical register, and clears a bit in the valid vector stored in the valid vector circuit 80 to invalidate that previous assignment. Additionally, the control circuit 70 selects an unused entry in the logical register list circuit 82, and sets the contents (the X bits) of that selected entry to identify the logical register. That logical register is now considered assigned to the physical register corresponding to the selected entry. The control circuit 70 then sets a corresponding bit in the valid vector to validate the newly generated assignment.

When instructions are mapped, the instruction map stage 36 renames logical operands to physical operands based on valid register assignments currently in the renaming circuit 54. After an instruction has been mapped, the instruction map stage 36 temporarily stores the set of valid register assignments that were used while mapping that instruction in the valid silo circuit 72. In particular, the control circuit 70 transfers the valid vector currently stored in the M bits of the valid vector circuit 72 to one of the J columns of the valid silo circuit 72. As will be explained later, the valid silo circuit 72 uses pointers to track its usage.

If the pipeline 30 determines that instruction execution has proceeded down an incorrect instruction branch, the instruction map stage 36 restores the previous register assignments quickly and easily by transferring the stored register assignments (i.e., the valid vector of M bits in one of the J columns) from the valid silo circuit 72 to the valid vector circuit 80 so that the instruction map stage 36 can map instructions of an alternative instruction branch. The particular valid vector that is retrieved is based on which instruction must be re-mapped by the instruction map stage 36. That is, the control circuit 70 retrieves the valid vector having the current register assignments for the first instruction that needs to be re-mapped.

When the instruction retire stage 56 retires an instruction, it sends a retire signal 48 indicating retirement of that instruction. The renaming circuit 54 receives the retire signal 48 and cancels the register assignments (e.g., the valid vector of M bits for that instruction) stored in the valid silo circuit 72 for the retired instruction.

As explained earlier, the renaming circuit 54 replaces logical registers identified by logical destination operands with physical registers by generating new register assignments according to existing assignments stored in the valid register circuit 76. The free list circuit 74 stores a free list vector in its M bits indicating which of the M physical registers are assigned to logical registers, and which are unassigned. In particular, the free list circuit 74 performs a logical OR operation for each of the M entries in the valid silo circuit 72, and stores the results as bits of the free list vector. If each of the bits in one of the M entries of the valid silo circuit 72 is clear (i.e., there are no stored assignments), the physical register corresponding to that entry is unused. Otherwise, the physical register corresponding to that entry is considered to be in use and unavailable for another assignment.

When the renaming circuit 54 generates a new register assignment, the control circuit 70 finds an unused physical register by accessing the free list vector. Preferably, the control circuit 70 starts at an end of the free list vector, and searches the free list vector for an unused physical register (i.e., a bit that is clear). When the control circuit 70 finds an unused physical register, the control circuit 70 generates an assignment that uses the found physical register.

Figure 3:
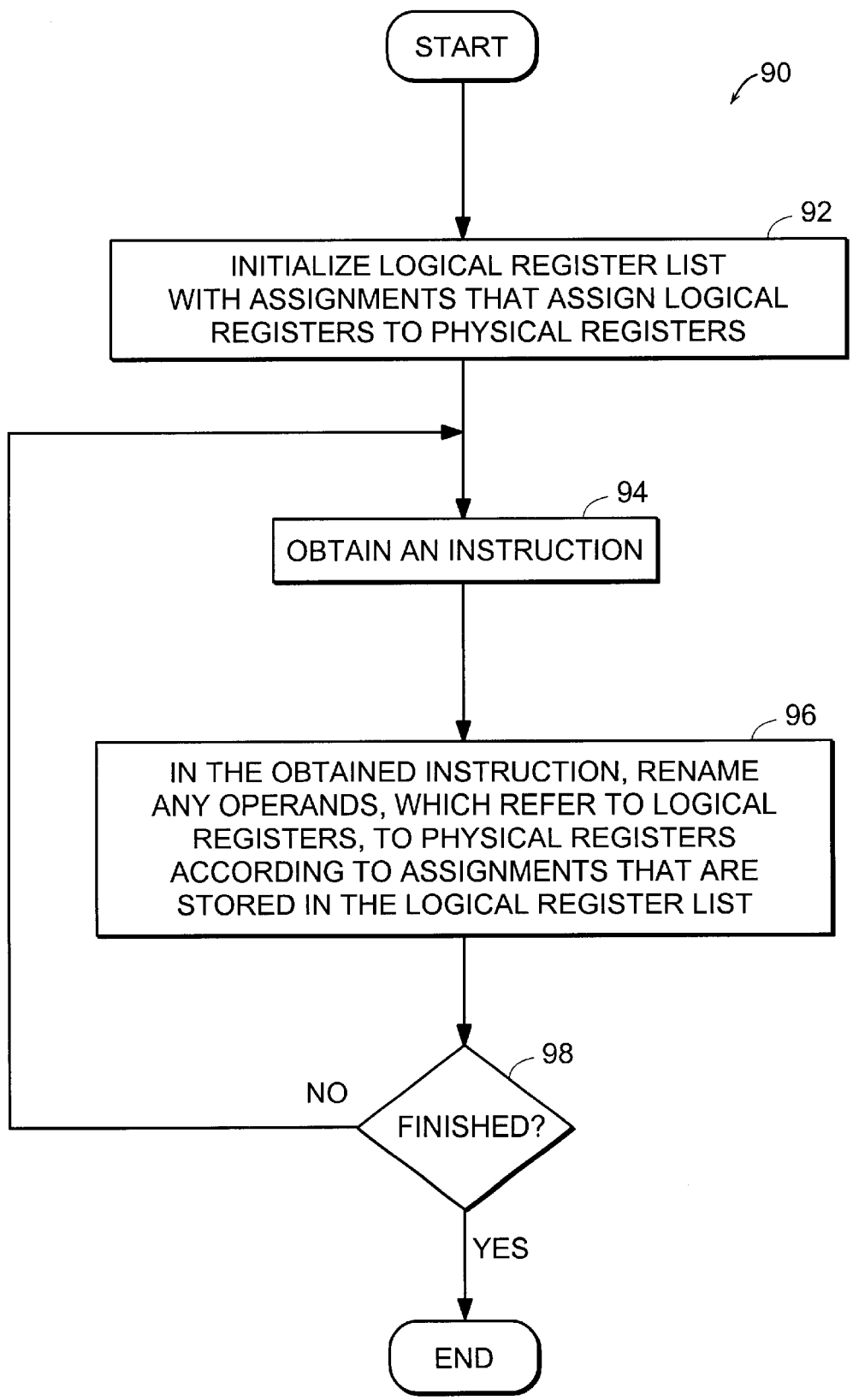
FIG. 3 is a flow diagram of a method for mapping instructions performed by the pipeline shown in FIG. 1.

The instruction map stage 36 will now be further described with reference to FIGS. 3 and 4. FIG. 3 shows a general operation 90 of the portion 50 of the instruction map stage 36. In particular, when the instruction map stage 36 begins operation (e.g., at power up or upon reset), the instruction map stage 36 initializes the logical register list circuit 82 with initial register assignments that assign the logical registers supported by the pipelined processor 30 to the physical registers, as shown in step 92 of FIG. 3. In step 94, the instruction map stage 36 receives an instruction from the previous instruction stage. In step 96, the instruction map stage 36 renames any logical operands identifying logical registers with physical operands identifying physical registers. In step 98, the instruction map stage proceeds back to step 94 to map another instruction unless the pipelined processor 30 is deactivated (e.g., powered down or halted).

Figure 4:
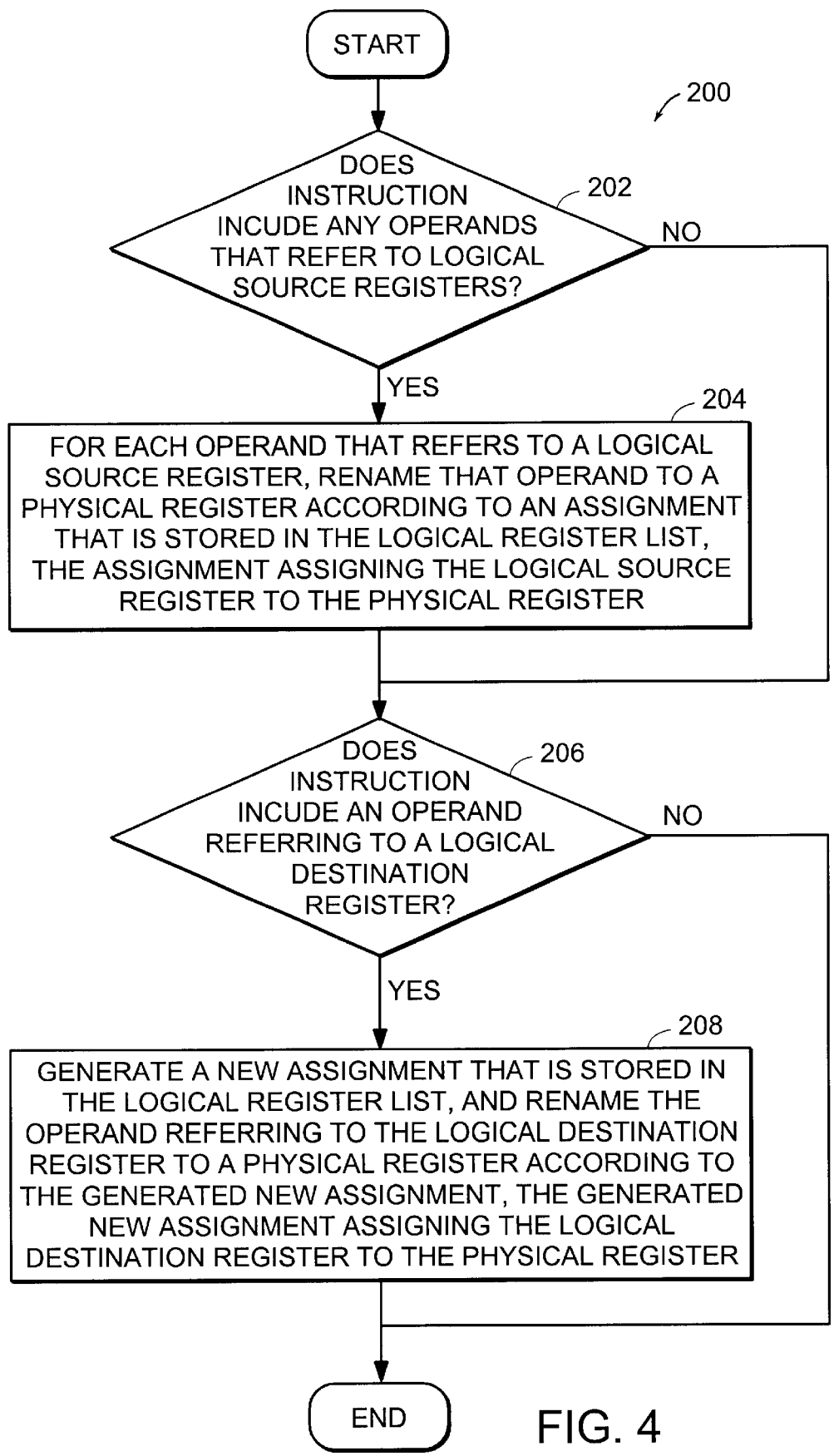
FIG. 4 is a flow diagram of a step for renaming operands of an instruction shown in FIG. 3.

FIG. 4 shows a series of substeps 200 for step 96 in FIG. 3. In particular, in step 202, the source and destination driver circuit 52 determines whether the instruction obtained in step 94 (see FIG. 3) has any logical source operands. If not, step 202 proceeds to step 206. If so, step 202 proceeds to step 204 where the renaming circuit 54, the register encoder 56 and the instruction decoder 58, operate to replace the logical source operands with physical source operands. The physical source operands identify physical registers to which are assigned logical registers identified by the logical source operands. The selection of physical registers is based on existing register assignments stored in the valid register circuit 76. Step 204 then proceeds to step 206.

In step 206, the source and destination driver circuit 52 determines whether the obtained instruction has a logical destination operand. If the obtained instruction has no logical destination operand, the series of substeps 200 ends. Otherwise, step 206 proceeds to step 208. In step 208, the renaming circuit 54 generates a new register assignment based on existing register assignments stored in the valid register circuit 76. The generated new assignment assigns the logical register identified by the logical destination operand to an available physical register. Then, the register encoder 56 and the instruction decoder 58 operate to replace the logical destination operand with a physical destination operand that identifies the physical register to which the identified logical register is assigned.

Further details of the operation of the renaming circuit 54 will now be provided by the following example. In the example, there are 16 physical registers (P0 through P15) available for use such that M equals 16. Additionally, there is a maximum of eight instructions that can be inflight at any given time such that J equals 8. Furthermore, the processor supports seven logical registers (R0 through R6).

FIG. 5 shows, for the example, the contents of the storage bits of the valid silo circuit 72, the valid vector circuit 80 and the logical register list circuit 82. The valid silo circuit 72 (VALID SILO) includes a 16×8 storage matrix. The 16 rows of the matrix respectively correspond to the physical registers, as shown in FIG. 5. Additionally, the valid vector circuit 80 (VALID BIT) includes a 16 bit valid vector (i.e., 16 valid bits). Furthermore, the logical register list circuit 82 (REG. LIST) includes 16 entries, each entry having enough bits to uniquely identify the seven logical registers supported by the pipelined processor (e.g., 3 bits).

As shown in FIG. 5, the renaming circuit 54 has initialized the valid vector circuit 80 and the logical register list 82 to store seven register assignments (also see FIG. 3, step 92). In particular, logical register R0 is assigned initially to physical register P0, logical register R1 is assigned initially to physical register P1, and so on. The valid bits of the valid vector circuit 80 are set to indicate that the initial register assignments are valid. The valid silo circuit 72 uses an insert pointer I to track storage of the valid vectors from the valid vector circuit 80. In particular, the insert pointer I points to entry 0 (a first column) of the valid silo circuit 72, and the control circuit 70 transfers a copy of the 16 bit valid vector that is stored currently in the valid vector circuit 80 into entry 0.

For the example, the instruction map stage 36 maps the following instruction stream, where (OP) represents a type of operation (e.g., shift, logical AND, etc.).

LOAD R1                          (1)

LOAD R3                          (2)

R1=R1 (OP) R3                 (3)

R2=R1+1                          (4)

R1=R3+1                          (5)

R5=R1 (OP) R2                 (6)

For each instruction, the instruction map stage 36 replaces the logical operands with physical operands (FIG. 3, steps 94 and 96).

For instruction (1), the instruction map stage 36 determines that the instruction includes no logical source operands (FIG. 4, step 202) and includes a logical destination operand identifying logical register R1 (FIG. 4, step 206). Accordingly, the instruction map stage 36 generates a new valid assignment (FIG. 4, step 208). In particular, the instruction map stage 36 finds a previous assignment for logical register R1 in the logical register list circuit 82 (the entry for physical register P1), and clears the corresponding bit in the valid vector stored in the valid vector circuit 80, as shown in FIG. 6. Then, the instruction map stage 36 selects an unused entry in the logical register list circuit 82 (the entry for physical register P7), and sets the contents of the selected entry to identify logical register R1, as shown in FIG. 6. As shown in FIG. 6, the circuits now store a valid register assignment that assigns logical register R1 to physical register P7, and an invalid assignment that assigns logical register R1 to physical register P1.

The instruction map stage 36 uses the newly generated valid assignment to map instruction (1). In particular, mapped instruction (1) is "LOAD P7". As shown in FIG. 6, a copy of the valid vector used to map instruction (1) is transferred to the next entry (entry 1) in the valid silo circuit 72 according to the insert pointer I, which is incremented.

As shown in FIG. 7, the instruction map stage 36 performs steps for instruction (2) similar to those performed for instruction (1). In particular, the renaming circuit 54 invalidates a previously stored assignment for logical register R3 by clearing a bit of the current valid vector stored in the valid vector circuit 80. Furthermore, the renaming circuit 54 generates a new assignment by selecting an unused entry in the logical register list 82, and setting the contents of that entry to identify logical register R3. Additionally, the renaming circuit 54 sets the corresponding bit of the valid vector to validate the newly generated assignment. The valid vector for instruction (2) is stored in entry 2 of the valid silo circuit 72 according to the insert pointer I, which is incremented. As a result, logical register R3 is assigned to physical register P8, and mapped instruction (2) is "LOAD P8".

Next, the instruction map stage 36 maps instruction (3). The instruction map stage 36 determines that instruction (3) includes logical source operands (FIG. 4, step 202). Accordingly, the instruction map stage 36 renames the logical source operands identifying logical registers R1 and R3 with physical source operands (FIG. 4, step 204). In particular, as shown in FIG. 7, the instruction map stage 36 searches the valid vector circuit 80 and the logical register list circuit 82 to find a valid assignment for logical register R1. The instruction map stage 36 finds a valid assignment that assigns logical register R1 to physical register P7. The circuits further include an invalid assignment that assigns logical register R1 to physical register P1 which is ignored. In a similar manner, the instruction map stage 36 finds a valid assignment that assigns logical register R3 to physical register P8.

Additionally, the instruction map stage 36 determines that instruction (3) further includes a logical destination operand that identifies logical register R1 (FIG. 4, step 206). Accordingly, as shown in FIG. 8, the instruction map stage 36 generates a new assignment for logical register R1. The generated new assignment assigns logical register R1 to physical register P9.

The instruction map stage 36 completes the series of substeps 200 by providing a mapped instruction (3) with the logical operands replaced with physical operands. In particular, mapped instruction (3) is "P9=P7 (OP) P8". The valid vector for mapped instruction (3) is stored in the valid silo circuit 72 in entry 3 according to the insert pointer I, and the insert pointer I is incremented.

Instructions (4), (5) and (6) are mapped in a manner similar to that of instruction (3), as shown in FIGS. 9–11. Furthermore, the valid vectors for those instructions are stored in the valid silo circuit 72. In particular, as shown in FIG. 8, instruction (4) has a logical source operand identifying logical register R1 which is replaced with a physical operand that identifies physical register P9 according to an existing register assignment. Additionally, as shown in FIG. 9, instruction (4) has a logical destination operand which causes generation of a new register assignment assigning logical register R2 to physical register P10. The logical destination operand identifying logical register P10 is replaced with a physical operand identifying physical register P10. Accordingly, mapped instruction (4) is "P10=P9+1". The valid vector for instruction (4) is stored in entry 4 of the valid silo circuit 72 according to the insert pointer I, and insert pointer I is incremented.

Similarly, as shown in FIG. 9, instruction (5) has a logical source operand identifying logical register R3 which is replaced with a physical operand that identifies physical register P8 according to an existing register assignment. Additionally, as shown in FIG. 10, instruction (5) has a logical destination operand that causes generation of a new register assignment assigning logical register R1 to physical register P11. The logical destination operand identifying logical register R1 is replaced with a physical operand identifying physical register P11. Accordingly, mapped instruction (5) is "P11=P8+1". The valid vector for instruction (5) is stored in entry 5 of the valid silo circuit 72 according to the insert pointer I, and insert pointer I is incremented.

In a similar manner, the instruction map stage maps instruction (6). As shown in FIG. 10, instruction (6) has logical source operands identifying logical registers R1 and R2, which are replaced with physical operands that identify physical registers P11 and P10, respectively, according to existing register assignments. Additionally, as shown in FIG. 11, instruction (6) has a logical destination operand which causes generation of a new register assignment assigning logical register R5 to physical register P12. The logical destination operand identifying logical register R5 is replaced with a physical operand identifying physical register P12. Accordingly, mapped instruction (6) is "P12=P11 (OP) P10". The valid vector for instruction (6) is stored in entry 6 of the valid silo circuit 72 according to the insert pointer I, and insert pointer I is incremented.

The results of mapping of instructions (1) through (6) is as follows.

| INSTRUCTION NUMBER | PREMAPPED INSTRUCTION | MAPPED INSTRUCTION |
|---|---|---|
| 1 | LOAD R1 | LOAD P7 |
| 2 | LOAD R3 | LOAD P8 |
| 3 | R1 = R1 (OP) R3 | P9 = P7 (OP) P8 |
| 4 | R2 = R1 + 1 | P10 = P9 + 1 |
| 5 | R1 = R3 + 1 | P11 = P8 + 1 |
| 6 | R5 = R1 (OP) R2 | P12 = P11 (OP) P10 |

A WAW dependency exists between premapped instructions (3) and (5) since both instructions write to register R5. From an inspection of the mapped instructions, it should be clear that the WAW dependency has been resolved and that no instruction dependency exists between mapped instructions (3) and (5). Accordingly, instructions (3) and (5) are independent of each other and can issue in any order relative to each other. Similarly, a WAR dependency exists between premapped instructions (4) and (5). From an inspection of the mapped instructions, it should be clear that the WAR dependency has been resolved and that no instruction dependency exists between mapped instructions (4) and (5). Accordingly, instructions (4) and (5) are independent of each other and can issue in any order relative to each other. Thus, data hazards such as WAW and WAR dependencies are resolved without a need to delay instructions.

Eventually, instructions that were mapped by the instruction map stage 36 and that were provided to subsequent instruction stages of the pipeline 30 are retired, or killed if execution proceeded down an incorrect instruction branch. When an instruction is retired, the instruction retire stage 46 sends a retire signal 48 to the instruction map stage 36. The instruction map stage 36 responds by canceling valid vectors in the valid silo circuit 72. In particular, the instruction map stage 36 uses a retire pointer R that points to entries that are retired. As shown in FIG. 12, instruction (1) has been retired, the retire pointer R points to entry 0 corresponding to instruction (1), and the valid vector in entry 0 has been canceled.

As the pipeline 30 continues operating, additional instructions are retired, and the instruction map stage 36 responds to the retire signal 48 by canceling additional valid vectors in the valid vector silo circuit 72. As shown in FIG. 13, instructions (2) and (3) have also been retired and the retire pointer R has canceled entries 2 and 3 which corresponded to instruction (2) and (3). At this point, it should be clear that the retire pointer R follows (or chases) the insert pointer I.

If it is determined that execution has occurred down an incorrect instruction branch (e.g., through receipt of a kill notification in the retire signal 48), the instruction map stage 36 restores previous assignments by transferring a valid vector from the valid silo circuit 72 to the valid vector circuit 80. By way of example, instruction (5) must be remapped such that the assignments prior to mapping instruction (5) (i.e., the valid vector for instruction (4) in entry 4) must be transferred from the valid silo circuit 80 to the valid vector circuit 82, as shown in FIG. 13. The instruction map circuit 36 uses a kill pointer K to identify the entry that is to be transferred back to the valid vector circuit 82. Kill pointer K must reside between the insert pointer I and the retire pointer R.

As mapping continues, the end of the M×J matrix of the valid silo circuit 72 will be reached. When this occurs, storage of valid vectors should wrap around, i.e., begin again at entry 0. Accordingly, for the matrix shown in FIGS. 5–13, storage of valid vectors can continue in entry 0 after entry 7 is used. At least one entry will always be available in the matrix since the matrix preferably is made large enough to accommodate the maximum number of inflight instructions supported by the pipeline 30.

Figure 14:
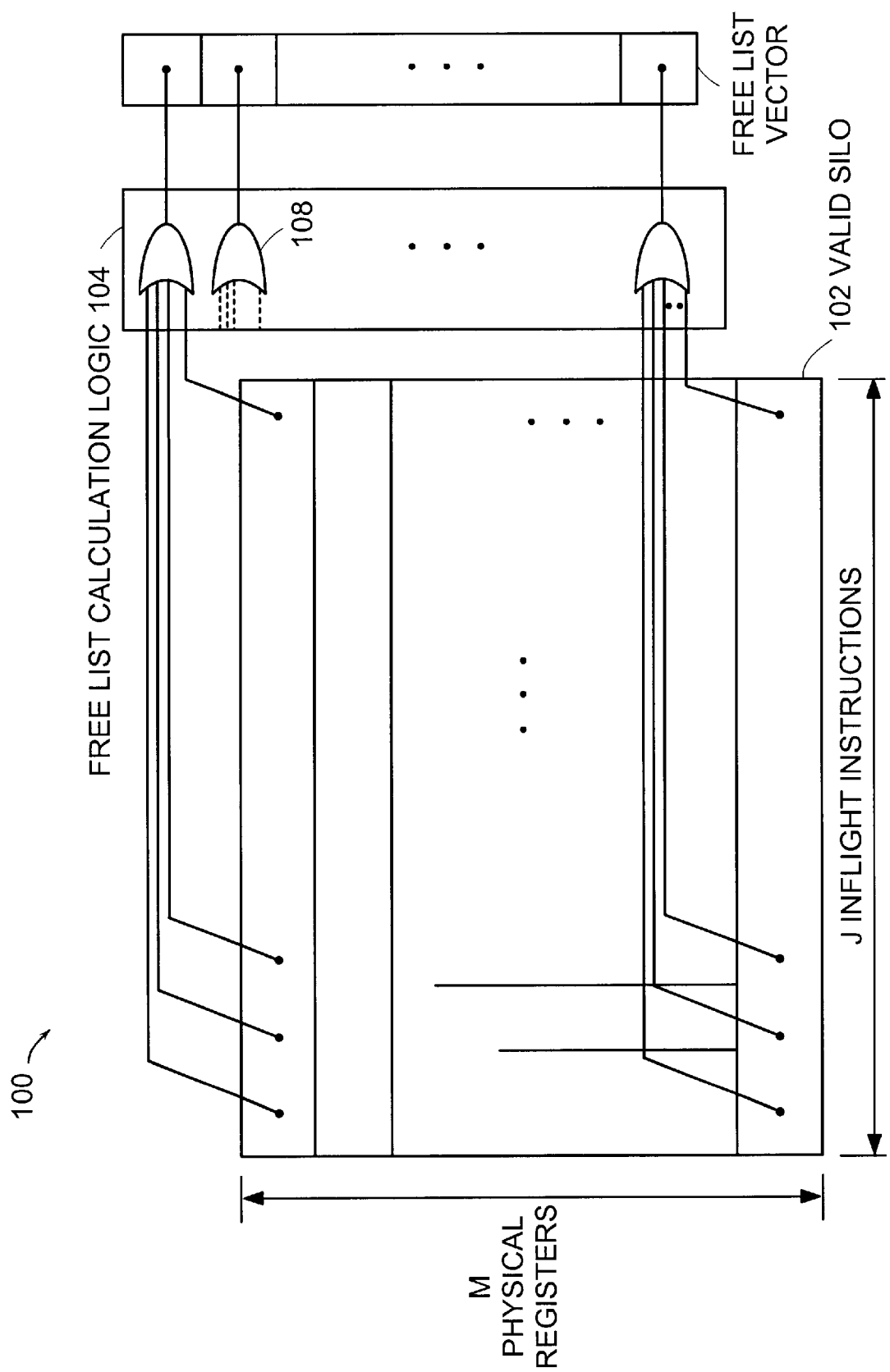
FIG. 14 is a circuit diagram of a portion of a free list circuit shown in FIG. 2.

The mechanism for identifying unused (available) entries in the logical register list circuit 82 will now be discussed. FIG. 14 shows circuitry 100 which includes the M×J matrix (valid silo 102) of the valid silo circuit 72, free list calculation logic 104 and free list vector storage 106. The free list calculation logic 104 and free list vector storage 106 form part of the free list circuit 74. The free list calculation logic 104 performs a set of logical OR operations 108 to determine which entries of the logical register list circuit 82 are unused. In particular, each logical OR operation and each bit of the free list vector stored in the free list vector storage 106 corresponds to one of the entries in the logical register list circuit 82. When each bit across the J entries of the valid silo 102 is clear, the logical OR operation indicates that the corresponding entry in the logical register list circuit 82 is available. Otherwise, that entry is in use and unavailable.

Figure 15:
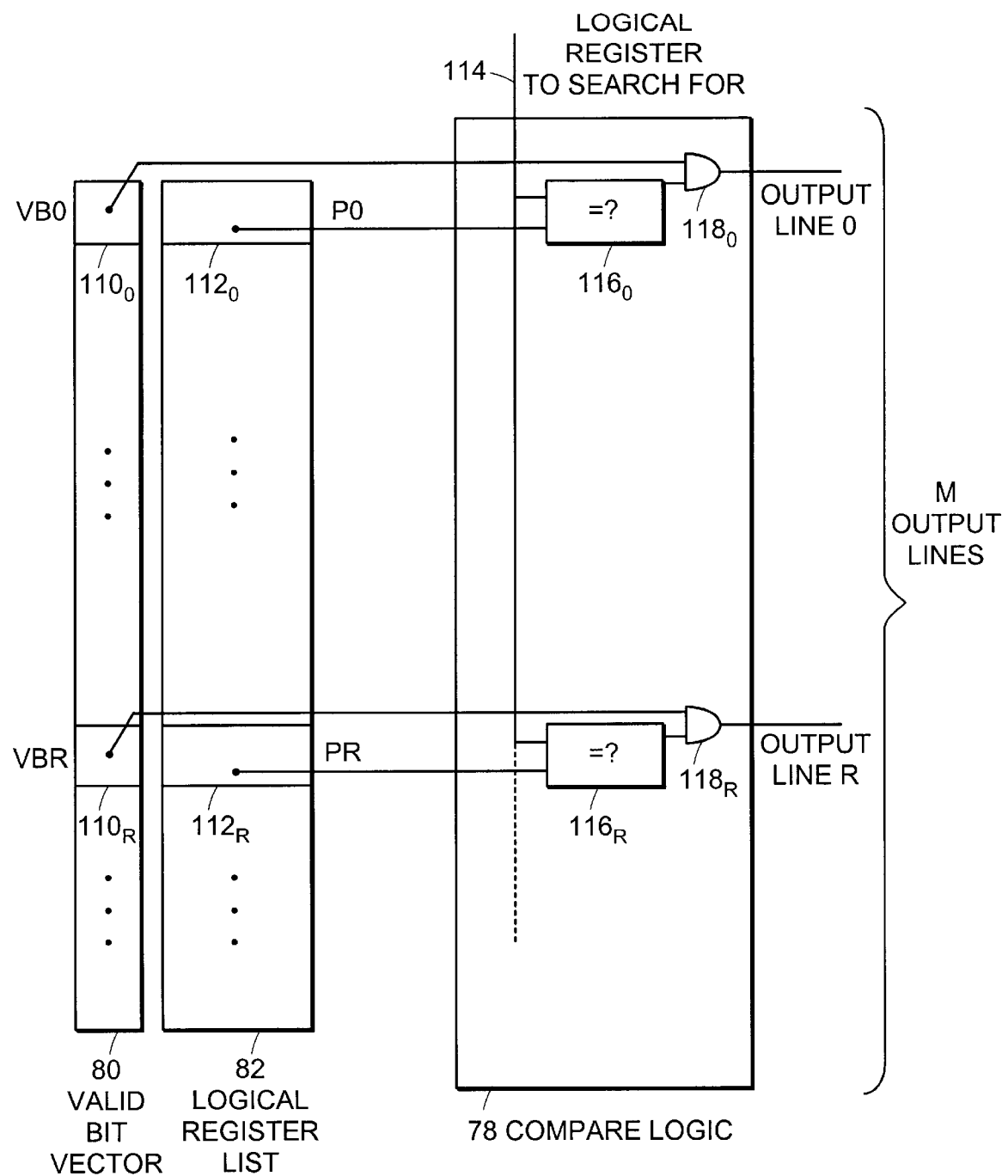
FIG. 15 is a circuit diagram of a portion of a register compare circuit shown in FIG. 2.

As shown in FIG. 15, the register compare logic 78 (see FIG. 2) of the instruction map stage 36 operates to find register assignments (i.e., physical registers assigned to logical registers) in the logical register list circuit 82. The identified physical registers are provided to the register encoder 56 so that the physical operands for the mapped instructions can be determined.

The register compare logic 78 has a set of elements including compare elements 116 and logical AND elements 118. Each compare element has an input to a corresponding entry 112 in the logical register list circuit 82 and another input to a connection 114 that receives a signal identifying a logical register to search for (e.g., logical register information such as that provided by the source and destination driver circuit 52 in FIG. 2). Each logical AND element 118 has a first input that connects with an output of a corresponding compare element 116, and a second input that connects with a corresponding bit 110 of the valid vector circuit 80. The element 116,118 provide M output lines.

During operation, the compare logic compares the logical register identified on connection 114 with the contents of each entry in the logical register list circuit 82. The outputs of the compare elements 116 indicate which entries match. The logical AND elements 118 then select the valid entry from the entries that matched. There can only be one valid assignment assigning a particular logical register to a physical register at any one time. Accordingly, that can only be one valid entry selected from the entries that matched. As a result, only one of the M output lines will be asserted.

The register compare logic 78 preferably includes a set of elements 116,118 for each logical register that needs to be searched for. Accordingly, for a pipeline processor that processes instructions that use two source operands S0, S1 and one destination operand D, the register compare logic 78 has three sets of elements 116,118 (one for each operand). The set of elements 116,118 for the destination operand D selects the entry of the valid vector circuit 80 that must be cleared to invalidate the next valid register assignment that is generated.

Figure 16:
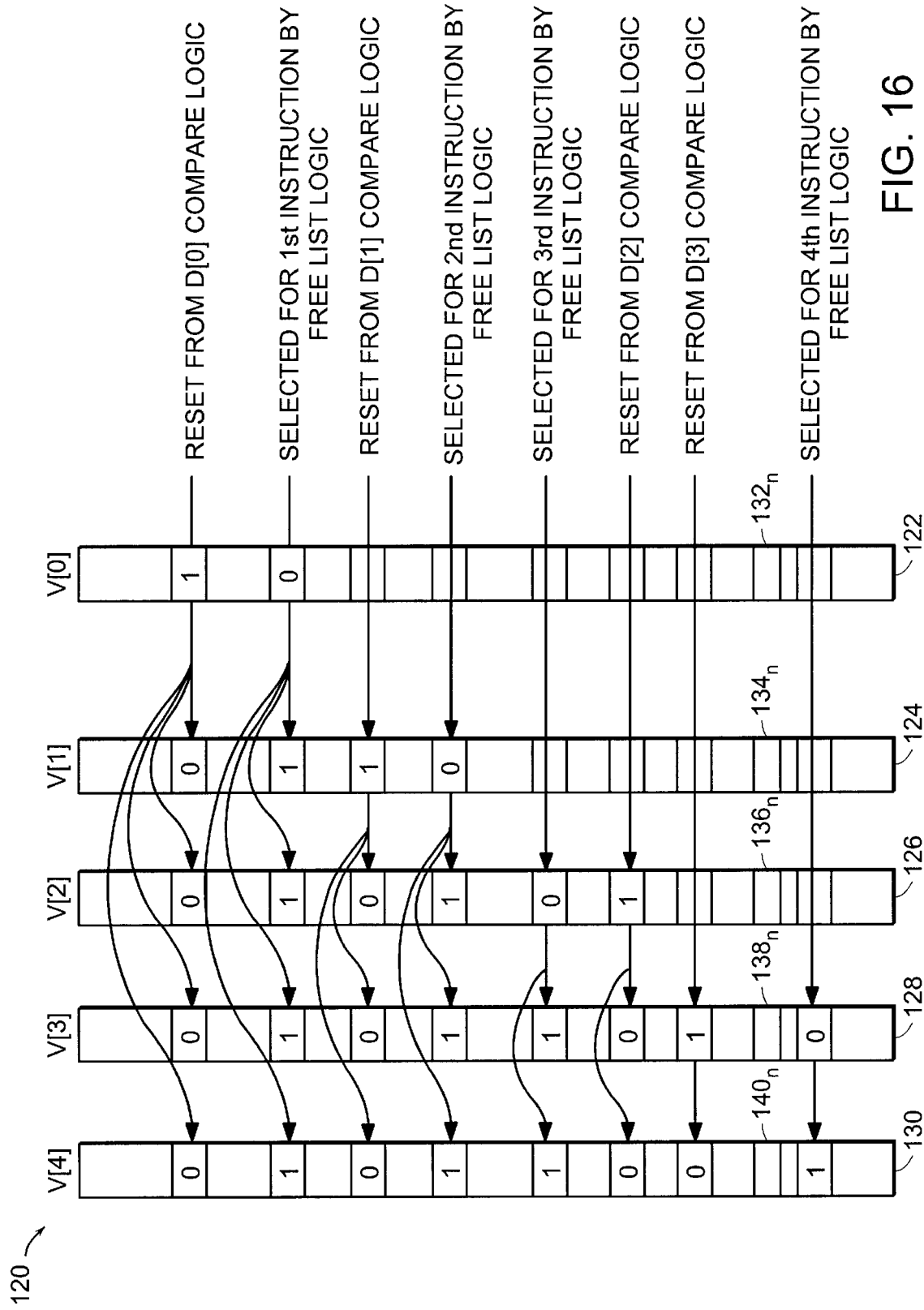
FIG. 16 is a circuit diagram of a portion of a valid vector circuit shown in FIG. 2 used when multiple instructions are mapped simultaneously.

According to a multiple instruction embodiment of the invention, multiple instructions are mapped simultaneously by the instruction map stage 36. The renaming circuit 54 maintains multiple valid vectors for the instructions since each instruction generally causes two bits to change in a previous valid vector (one bit to invalidate an assignment, and one bit to validate a new assignment). FIG. 16 shows multiple valid vectors 120 stored by the valid vector circuit 72 for the multiple instruction embodiment. By way of example, the instruction map stage 36 maps four instructions simultaneously. Valid vector V[0] is the valid vector of the last instruction mapped by the instruction map stage 36. The valid vector V[0] includes entries 132 (e.g., entry 132n). Valid vectors V[1] through V[4] respectively correspond to the four instructions that are currently being mapped simultaneously. The valid vector V[1] includes entries 134 (e.g., entry 134n). The valid vector V[2] includes entries 136 (e.g., entry 136n). The valid vector V[3] includes entries 138 (e.g., entry 138n). The valid vector V[4] includes entries 140 (e.g., entry 140n).

Generation of a new valid register assignment for the first instruction of the four instructions to be mapped causes two bits of the valid vector V[0] to be changed. In particular, one bit of the valid vector V[0] is cleared to invalidate an existing assignment, and the other bit is set to validate the newly generated assignment. This operation should be evident by a comparison of the bits in valid vectors V[0] and V[1] in FIG. 16.

Similarly, generation of a new valid register assignment for the second instruction of the four instructions to be mapped causes two bits of the valid vector V[1] to be changed. As with the first instruction, one bit of the valid vector V[1] is cleared to invalidate an existing assignment, and the other bit is set to validate the newly generated assignment. This operation should be evident by a comparison of the bits in valid vectors V[1] and V[2] in FIG. 16. Two bits similarly change between valid vectors V[2] and V[3], and between valid vector V[3] and V[4], as shown in FIG. 16.

In the multiple instruction embodiment, the control circuit 70 finds multiple unused physical registers using the free list vector in the free list circuit 74. Preferably, the control circuit 70 searches the free list vector starting at both ends. Searching continues toward the middle of the free list vector until an unused physical register is found for each register assignment to be generated.

As the multiple instructions are mapped, the multiple valid vectors are stored in the valid silo circuit 72 simultaneously. When a wrong speculative branch of instructions is executed and previous assignments must be retrieved from the valid silo circuit 72, the correct valid vector is transferred from the valid silo circuit 72 to the valid vector circuit 80.

The register compare logic 78 shown in FIG. 15 is enhanced for the multiple instruction embodiment. In particular, the register compare logic 78 preferably includes a set of elements 116,118 for each logical register that needs to be searched for. For a pipeline processor that processes four instructions at a time, each instruction using two source operands and one destination operand, the register compare logic 78 preferably has 12 sets of elements 116,118 (one for each operand of the four instructions). That is, for the first instruction, there must be a set of elements 116,118 for each of two source operands S0[0], S1 [0] and a set of elements 116,118 for a destination operand D[0]. Similarly, for the second instruction, there must be a set of elements 116,118 for each of two source operands S0[1], S1 [1] and a set of elements 116,118 for a destination operand D[1], and so on.

Figure 17A:
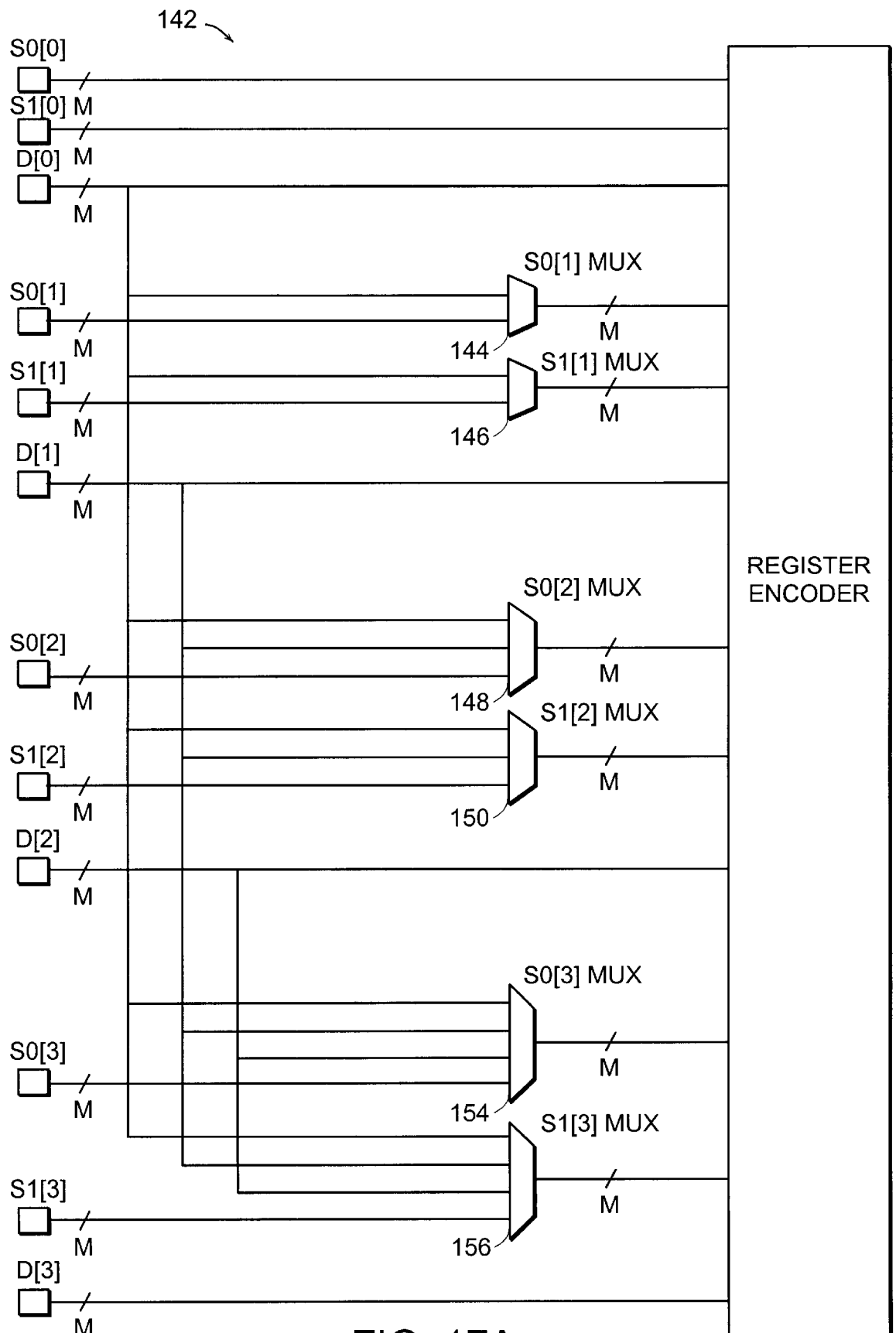
FIG. 17A is a circuit diagram of an additional portion of the register compare circuit shown in FIG. 2 used when multiple instructions are mapped simultaneously.

For the multiple instruction embodiment, the register compare logic 78 further includes a set of multiplexers 142 that determine which assigned physical register to use for each instruction. The multiplexers 142 are shown in FIG. 17A for a multiple instruction embodiment that processes four instructions simultaneously. The outputs of the elements 116,118 (some through the multiplexers 142) are provided to a register encoder 158 which provides physical operands for the four mapped instructions in a manner similar to that of the register encoder 56 for a single instruction. The logical equations for each set of elements 116,118 are provided in FIG. 17B. The output lines for the destination operands D are used also to find bits within the valid vector circuit 82 that are to be cleared to invalidate register assignments for four new instructions that follow the four instructions currently being mapped.

For either the single instruction embodiment or the multiple instruction embodiment, the free list calculation logic 104 shown in FIG. 14 may include a large OR calculation across all bits of the J columns for each row of the matrix in the valid silo circuit 72 (e.g., multiple layers of OR gates). Alternatively, as shown in FIG. 18, the free list circuit 74 may include masking circuitry 164 to reduce the number of clear operations when canceling valid vectors upon instruction retirement. In particular, bits of each row of the valid silo circuit 72 can be grouped for smaller logical OR calculations 168, and the outputs 170 of such calculations can be compared with a set of mask bits 172 using logical AND calculations 174. The results of the logical AND calculations can be logically OR'd together to provide a bit of a free list vector 166 stored in the free list circuit 74. With the circuitry 164, entire groups of bits of a row of the matrix in the valid silo circuit can be enabled or masked out at one time by setting or clearing a particular mask bit. In particular, when one of the bits in the group is set, the mask bit for that group is set as well. However, to disable all the bits when the columns are to be canceled, rather than clear each bit individually, the mask bit can be cleared instead.

Figure 19:
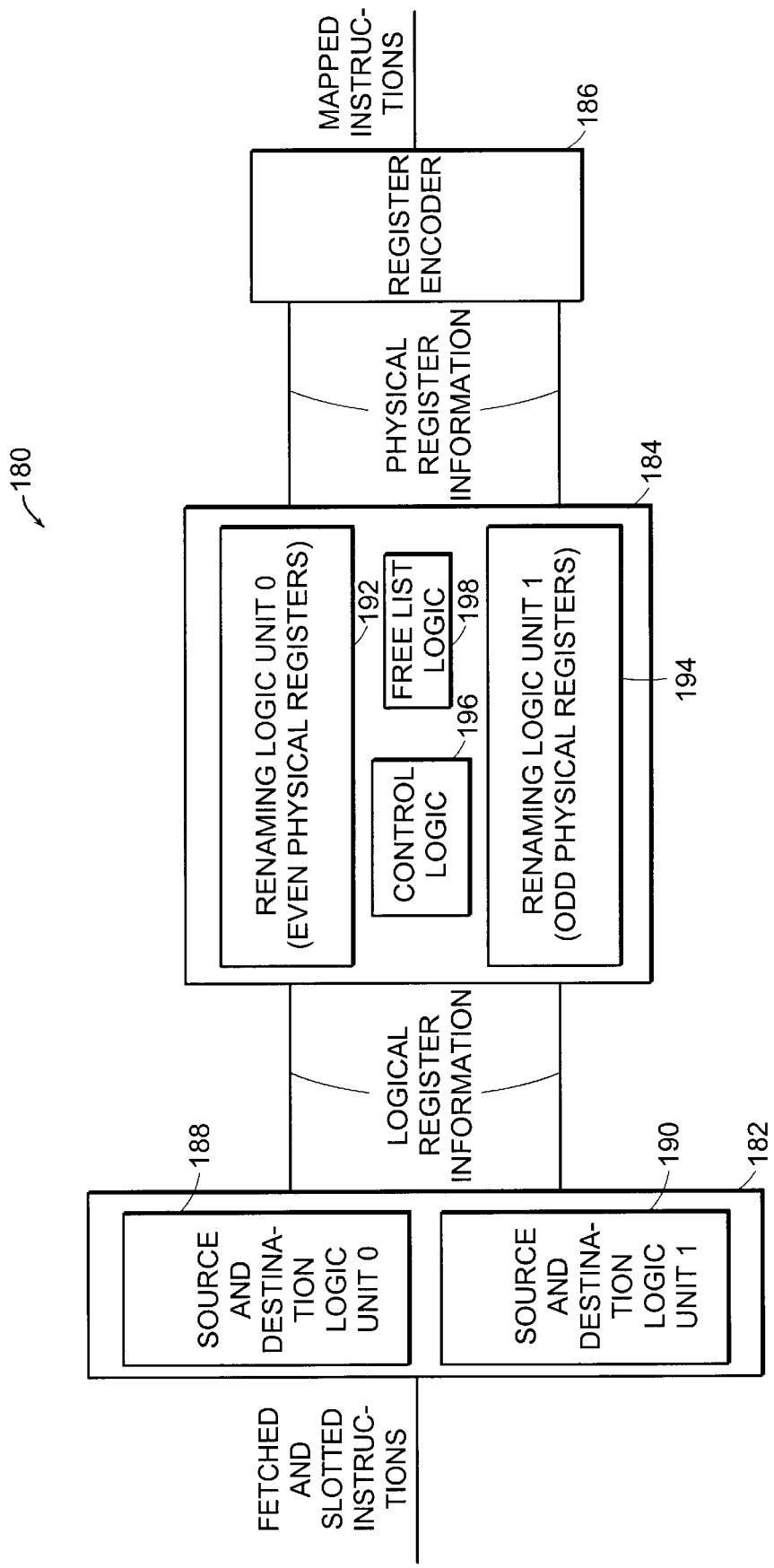
FIG. 19 is a circuit diagram of alternative portions of the instruction map stage to that shown in FIG. 2.

The pipelined processor 30 can be implemented as an integrated circuit device. The portion 50 of the instruction map stage can be disposed within the device as shown in FIG. 2. Alternatively, as shown in FIG. 19, the portion 50 can be replaced with a rearranged portion 180. In particular, FIG. 19 shows the portion 180 as including a source and destination driver circuit 182 that is divided into a source and destination logic unit0 188 and a source and destination logic unit1 190. Furthermore, the portion 180 includes a renaming circuit 184 having two renaming logic units, i.e., renaming logic unit0 192 for handling even numbered physical registers and renaming logic unit1 194 for handling odd numbered physical registers. The renaming circuit 184 further includes control logic 196 and free list logic 198 that operate in a manner similar to that described above for the portion 50 (see FIG. 2). The portion 180 further includes a register encoder 186 that connects with the renaming circuit 184 and provides mapped instructions.

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

For example, the insert and retire pointer logic used by the valid silo circuit 72 is simple and easily expandable. In particular, when increasing the capacity of the valid silo circuit 72 to store more valid vectors, the insert and retire pointer logic is simply modified to traverse a larger range of entries (columns).

Additionally, the orders of certain steps in FIGS. 3–4 can be changed. For example, step 96 in FIG. 3 can proceed for a first instruction while step 94 begins for a second instruction.

Furthermore, certain optimizations can be made to the circuits to reduce the amount of time required to perform particular operations. For example, the logical elements 116 and 118 for each output line of the compare logic 78 (see FIG. 15) can be implemented as a single element or circuit (e.g., one gate) to minimize the amount of time needed to properly provide the output signals on the M output lines.

What is claimed is:

1. An apparatus for mapping instructions in a data processing system to resolve dependencies in an original register assignment such that Write-After-Write (WAW) and Read-After-Write (RAW) dependencies are eliminated in an output mapped instructions, thereby permitting issuance of the output mapped instructions in any order relative to each other, the apparatus comprising:

means for maintaining a logical register list having entries, each entry corresponding to each of a plurality of physical registers, each entry indicating a possible assignment of a logical register to a physical register, means for maintaining a valid vector, the valid vector having a number of bits corresponding to the plurality of physical registers, the bits of the valid vector indicating, together with the logical register list, a list of valid and invalid logical to physical register assignments, with logical false bits indicating a corresponding invalid logical register to physical register assignments, and logical true bits indicating a corresponding valid logical register to physical register assignments;

means for obtaining an instruction to be mapped, the instruction including potentially source operands and destination operands; and means for mapping the instruction, the means for mapping examining the instruction to be mapped to determine whether each of the source operands includes a reference to a logical register, and if the instruction to be mapped includes logical source operand, the means for mapping also including replacing the logical source operand with a physical source operand by examining existing register assignments stored in the logical register list and their associated bits of the valid vector;

if the instruction to be mapped includes a logical destination operand, the means for mapping also actuating:

means for identifying a new logical register assignment from the existing register assignments stored in the logical register list and the valid vector;

means for replacing the logical destination operand with a physical destination operand that identifies a physical register to which the identified new logical register is assigned;

means for locating an entry in the logical register list previously assigning the referenced logical register to another physical register, and clearing a corresponding bit in the valid vector to a false state, in order to invalidate that previous assignment; and means for selecting an unused entry in the logical register list and setting contents of that selected entry to identify the new logical register, and thus considering the new logical register to be assigned to the physical register corresponding to the selected entry; and means for storing, for an instruction that is mapped, a copy of the valid vector to a vector silo memory.

2. An apparatus as in claim 1 wherein the means for mapping comprises means for canceling the copy of the valid vector stored in the vector silo memory in response to a signal indicating that a corresponding mapped instruction is retired.

3. An apparatus as in claim 2 wherein the means for mapping comprises means for transferring the stored copy of the valid vector from the vector silo memory in response to a signal indicating that an incorrect instruction branch has executed, to restore the list of valid and invalid logical register to physical register assignments.

4. An apparatus as in claim 1 wherein, if execution has occurred down an incorrect instruction branch, the means for mapping further actuating means for restoring previous logical register to physical register assignments by transferring a valid vector from the vector silo memory to the valid vector.

5. An apparatus as in claim 1 wherein the means for mapping, upon reaching a storage capacity in the vector silo memory, further actuates means for continuing storage of valid vectors at a first entry location after a last entry location is used.

6. An apparatus as in claim 1 wherein the vector silo memory contains a number of entries equal to a maximum expected number of inflight instructions supported by a corresponding instruction pipeline.

7. An apparatus as in claim 1 wherein the entries of the logical register list each consist of a logical register identifier.

8. An apparatus as in claim 1 wherein the means for mapping includes a register-compare circuit for locating an entry in the logical register list, the register-compare circuit containing a logic element for each expected inflight instruction, and for each such expected inflight instruction, each possible source operand and destination operand.

9. An apparatus for mapping instructions in a data processing system to resolve dependencies in an original register assignment such that Write-After-Write (WAW) and Read-After-Write (RAW) dependencies are eliminated in an output mapped instructions, thereby permitting issuance of the output mapped instructions in any order relative to each other, the apparatus comprising:

a logical register list memory circuit having entries, each entry corresponding to each of a plurality of physical registers, each entry indicating a possible assignment of a logical register to a physical register;

a valid vector memory circuit storing, in a valid vector, a number of bits corresponding to the plurality of physical registers, the bits of the valid vector indicating, together with the logical register list memory circuit, a list of valid and invalid logical to physical register assignments, with logical false bits indicating a corresponding invalid logical register to physical register assignments, and logical true bits indicating a corresponding valid logical register to physical register assignments; and an instruction mapper for mapping an instruction, the instruction including potentially source operands and destination operands, wherein:

the instruction mapper examines the instruction to be mapped to determine whether each of the source operands includes a reference to a logical register, and if the instruction to be mapped includes logical source operand, the instruction mapper replaces the logical source operand with a physical source operand by examining existing register assignments stored in the logical register list memory circuit and their associated bits of the valid vector memory circuit;

if the instruction to be mapped includes a logical destination operand, the instruction mapper identifies a new logical register assignment from the existing register assignments stored in the logical register list memory circuit and the valid vector memory circuit;

replaces the logical destination operand with a physical destination operand that identifies a physical register to which the identified new logical register is assigned;

locates an entry in the logical register list memory circuit previously assigning the referenced logical register to another physical register, and clears a corresponding bit in the valid vector memory circuit to a false state, in order to invalidate that previous assignment; and selects an unused entry in the logical register list memory circuit and sets contents of that selected entry to identify the new logical register, and thus considers the new logical register to be assigned to the physical register corresponding to the selected entry; and stores, for an instruction that is mapped, a copy of the valid vector to a vector silo memory.

10. An apparatus as in claim 9 wherein the instruction mapper cancels the copy of the valid vector stored in the vector silo memory in response to a signal indicating that a corresponding mapped instruction is retired.

11. An apparatus as in claim 10 wherein the instruction mapper transfers the stored copy of the valid vector from the vector silo memory in response to a signal indicating that an incorrect instruction branch has executed, to restore the list of valid and invalid logical register to physical register assignments.

12. An apparatus as in claim 9 wherein, if execution has occurred down an incorrect instruction branch, the instruction mapper restores previous logical register to physical register assignments by transferring a valid vector from the vector silo memory to the valid vector memory circuit.

13. An apparatus as in claim 9 wherein the instruction memory, upon reaching a storage capacity in the vector silo memory, continues storage of valid vectors at a first entry location after a last entry location is used.

14. An apparatus as in claim 9 wherein the vector silo memory contains a number of entries equal to a maximum expected number of inflight instructions supported by a corresponding instruction pipeline.

15. An apparatus as in claim 9, wherein the entries of the logical register list memory circuit each consist of a logical register identifier.

16. An apparatus as in claim 9, wherein the instruction mapper includes a register-compare circuit for locating an entry in the logical register list memory circuit, the register-compare circuit containing a logic element for each expected inflight instruction, and for each such expected inflight instruction, each possible source operand and destination operand.

* * * * *